US012389107B2

(12) United States Patent
Saito

(10) Patent No.: US 12,389,107 B2
(45) Date of Patent: Aug. 12, 2025

(54) LENS SYSTEM AND PROGRAM FOR CONTROLLING A TOUCH DISPLAY

(71) Applicant: Tamron Co., Ltd., Saitama (JP)

(72) Inventor: Tomoharu Saito, Saitama (JP)

(73) Assignee: TAMRON CO., LTD., Saitama (JP)

(*) Notice: Subject to any disclaimer, the term of this patent is extended or adjusted under 35 U.S.C. 154(b) by 281 days.

(21) Appl. No.: 18/130,177

(22) Filed: Apr. 3, 2023

(65) Prior Publication Data
US 2023/0412909 A1 Dec. 21, 2023

(30) Foreign Application Priority Data

May 30, 2022 (JP) .................. 2022-087859

(51) Int. Cl.
H04N 23/63 (2023.01)
G02B 7/10 (2021.01)
G06F 3/04847 (2022.01)
G06F 3/0485 (2022.01)
G06F 3/0488 (2022.01)
G06F 3/04883 (2022.01)
H04N 1/00 (2006.01)
H04N 23/62 (2023.01)
H04N 23/67 (2023.01)
H04N 23/69 (2023.01)

(52) U.S. Cl.
CPC ....... *H04N 23/631* (2023.01); *G06F 3/04847* (2013.01); *G06F 3/0485* (2013.01); *G06F 3/0488* (2013.01); *G06F 3/04883* (2013.01); *H04N 1/00411* (2013.01); *H04N 23/62* (2023.01); *H04N 23/633* (2023.01); *G02B 7/10* (2013.01); *H04N 23/67* (2023.01); *H04N 23/69* (2023.01)

(58) Field of Classification Search
CPC ........ H04N 23/54; H04N 23/55; H04N 23/67; H04N 23/69; H04N 23/695; H04N 23/62; H04N 23/63; H04N 23/631; H04N 23/632; H04N 23/633; H04N 23/634; H04N 23/635; H04N 1/00408; H04N 1/00411; H04N 1/00413; G06F 1/1692; G06F 3/04847; G06F 3/0485; G06F 3/04855; G06F 3/0488; G06F 3/04883; G06F 2203/04808; G02B 7/10
See application file for complete search history.

(56) References Cited

U.S. PATENT DOCUMENTS 6,181,377 B1* 1/2001 Kobayashi ........... H04N 23/633
396/51
9,716,825 B1* 7/2017 Manzari .............. G06F 3/04883
(Continued)

FOREIGN PATENT DOCUMENTS

JP 2000-305006 A 11/2000

*Primary Examiner* — Twyler L Haskins
*Assistant Examiner* — Akshay Trehan
(74) *Attorney, Agent, or Firm* — Paratus Law Group, PLLC

(57) ABSTRACT

A lens system includes a lens optical system, a touch display, and at least one processor configured to control a part of a virtual screen to be displayed on the touch display in response to a user's scroll operation on the touch display, and controls the lens optical system such that a state of the lens optical system works with a part of the virtual screen to be displayed on the touch display.

11 Claims, 18 Drawing Sheets

(56) References Cited

U.S. PATENT DOCUMENTS

| | | | |
|---|---|---|---|
| 2003/0025802 A1* | 2/2003 | Mayer, Jr. | G03B 17/38 |
| | | | 348/E5.042 |
| 2004/0165879 A1* | 8/2004 | Sasaki | G02B 7/28 |
| | | | 396/137 |
| 2010/0281374 A1* | 11/2010 | Schulz | H04M 1/72469 |
| | | | 715/830 |
| 2011/0057957 A1* | 3/2011 | Kasahara | G06F 3/03547 |
| | | | 345/173 |
| 2011/0061023 A1* | 3/2011 | Kim | H04N 23/62 |
| | | | 715/810 |
| 2011/0093812 A1* | 4/2011 | Fong | G06F 3/0485 |
| | | | 715/810 |
| 2012/0242890 A1* | 9/2012 | Nakamoto | G03B 13/36 |
| | | | 348/346 |
| 2012/0274796 A1* | 11/2012 | Choi | H04N 23/62 |
| | | | 348/E5.022 |
| 2013/0148008 A1* | 6/2013 | Ikeda | H04N 23/633 |
| | | | 396/76 |
| 2013/0271637 A1* | 10/2013 | Park | H04N 23/62 |
| | | | 348/333.11 |
| 2015/0326793 A1* | 11/2015 | Mäkinen | H04N 23/69 |
| | | | 348/240.99 |
| 2021/0037189 A1* | 2/2021 | Maejima | H04N 23/631 |
| 2021/0112206 A1* | 4/2021 | Hwang | H04N 23/632 |
| 2021/0160435 A1* | 5/2021 | Pena | G06F 3/04883 |
| 2022/0417416 A1* | 12/2022 | Li | H04N 23/631 |

* cited by examiner

LENS SYSTEM AND PROGRAM FOR CONTROLLING A TOUCH DISPLAY

CROSS-REFERENCE TO RELATED APPLICATIONS

This application is based on and claims the benefit of priority from Japanese Patent Application No. 2022-087859, filed on May 30, 2022, the entire contents of which are incorporated herein by reference.

BACKGROUND OF THE INVENTION

Technical Field

The present invention relates to a lens system and a program.

Related Art

With the spread of moving image posting sites such as TikTok (registered trademark) and YouTube (registered trademark), there is an increasing need for a technique of moving image shooting using a camera such as a mirrorless camera and a technique for controlling a lens mounted on the camera.

As a technique for controlling a lens, for example, JP2000-305006 A describes a lens controller equipped with a shot function of moving a position of a lens in accordance with an operation position of an operation member and moving the lens to a shot position registered in advance in response to an instruction for shot execution. According to the technique described in JP2000-305006 A, a user operates a display member (slider) displayed on a monitor by a personal computer, thereby controlling focus, zoom, and diaphragm of a lens.

SUMMARY OF THE INVENTION

In movie shooting of moving image shooting, the focus may be controlled using follow focus. However, the follow focus requires many pieces of equipment such as a belt and a gear, and thus has disadvantages such as complicated installation work, expensive equipment cost, and occurrence of operation delay due to backlash of the gear, detection of a ring sensor, and the like.

When operating a manual focus ring in moving image shooting using a handheld camera, it is difficult to perform an operation while viewing a live view video, and there is also a disadvantage that camera shake occurs. Although autofocus is sometimes used to mitigate such disadvantages, autofocus is rarely used because erroneous selection of a focus target can occur.

One aspect of the present invention has been made in view of the above-described problems, and an object thereof is to achieve a lens system that is simple in operation, has a low delay, and can accurately control a lens optical system.

In order to solve the above problems, a lens system according to one aspect of the present invention includes a lens optical system; a touch display; and at least one processor configured to control a part of a virtual screen to be displayed on the touch display in accordance with a scroll operation of a user on the touch display, and control the lens optical system in such a manner that a state of the lens optical system works with the part of the virtual screen to be displayed on the touch display.

According to one aspect of the present invention, it is possible to achieve a lens system that is simple in operation, has a low delay, and can accurately control a lens optical system.

DESCRIPTION OF THE EMBODIMENTS

First Embodiment

Hereinafter, a first embodiment, which is one embodiment of the present invention, will be described in detail.
(Configuration of Lens System)

Figure 1:
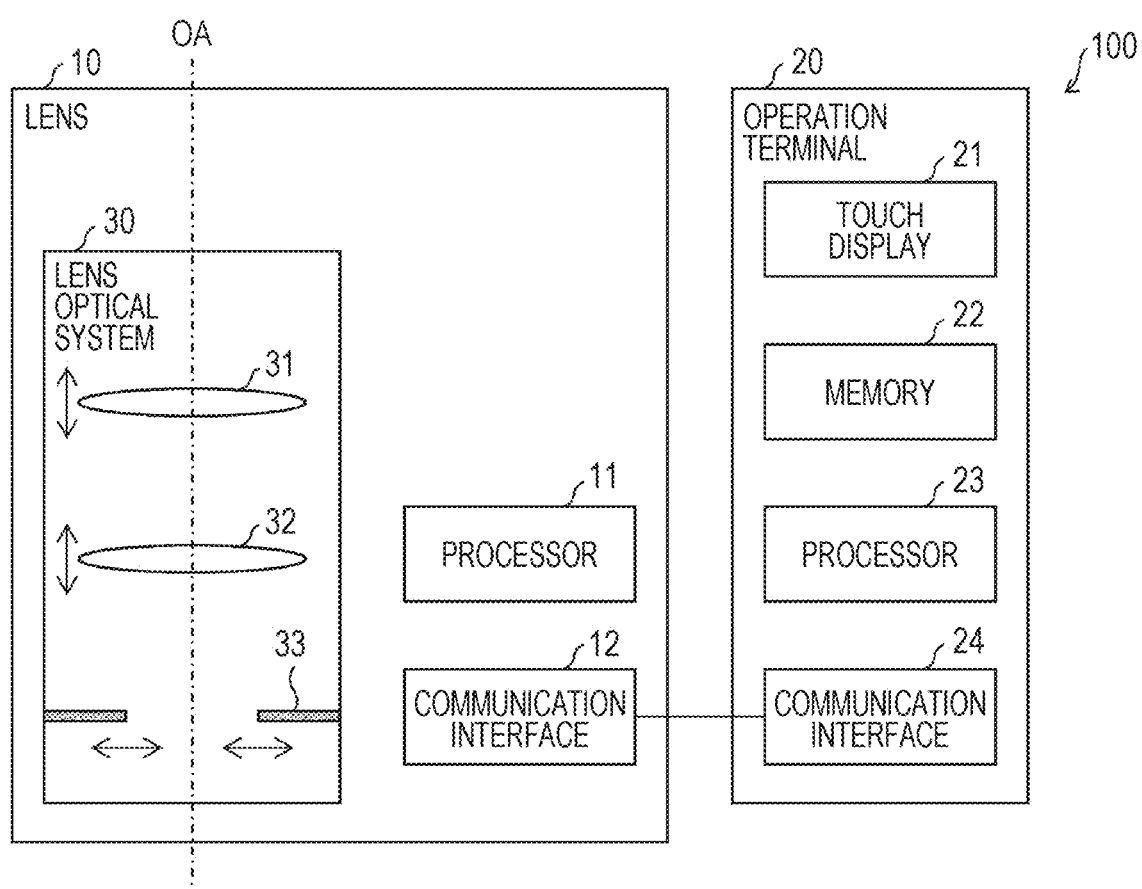
FIG. 1 is a block diagram showing a configuration of a lens system according to a first embodiment of the present invention.

The configuration of a lens system 100 according to the first embodiment of the present invention will be described with reference to FIG. 1. FIG. 1 is a block diagram showing the configuration of the lens system 100 according to the first embodiment of the present invention. The lens system 100 is a system for controlling a lens optical system to suitably obtain an image of a subject in at least one of still image shooting and moving image shooting. In the present description, the "lens optical system" refers to a lens unit including at least one single lens and a support member supporting the at least one single lens.

As shown in FIG. 1, the lens system 100 includes a lens 10 and an operation terminal 20. The lens 10 and the operation terminal 20 are communicably connected to each other via a communication means. In the present embodiment, the lens 10 and the operation terminal 20 are connected by a universal serial bus (USB) cable via a communication interface 12 included in the lens 10 and a communication interface 24 included in the operation terminal 20.

In the present embodiment, a USB cable is used as a communication means for connecting the lens 10 and the operation terminal 20, but the present invention is not limited to this. The communication means connecting the lens 10 and the operation terminal 20 may be any means capable of mediating transmission and reception of electronic data between the lens 10 and the operation terminal 20, and may be either a wired communication means or a wireless communication means. Specific examples of the wireless communication means include Wi-Fi (registered trademark) communication, near field communication (NFC), and Bluetooth (registered trademark) communication. The communication means may directly connect the lens 10 and the operation terminal 20 or may indirectly connect them. Examples of the network that can be interposed between the lens 10 and the operation terminal 20 include a local area network (LAN) and mount communication of a camera. In an embodiment using the mount communication of the camera, for example, the lens 10 is mounted on the mount of the camera, and the operation terminal 20 is communicably connected to the camera, thereby implementing the mount communication.

The operation terminal 20 has a configuration in which the user inputs an operation as an instruction to the lens system 100 and the state of the lens optical system is displayed to the user. In the present embodiment, a smartphone is used as the operation terminal 20. As shown in FIG. 1, the operation terminal 20 is separated from the lens 10 and includes a touch display 21, a memory 22, a processor 23, and the communication interface 24.

The touch display 21 has a configuration in which the user inputs a touch operation and the state of a lens optical system 30 is displayed to the user. In the present embodiment, the touch display 21 is an electronic component in which a touch sensor that detects a touch operation input by the user and a display that displays the state of the lens optical system 30 to the user are integrally combined. As a conversion method in the touch sensor, it is possible to appropriately adopt a known method such as a resistive film method, a capacitance method, a surface acoustic wave method, an infrared method, an electromagnetic induction method, an image recognition method, and an optical sensor method. As the display, it is possible to use a known display such as a liquid crystal display and an organic electroluminescent (EL) display.

In the present description, a "touch operation" refers to an operation involving touching on the touch display 21. Coming into contact with the touch display 21 with a finger or the like is simply referred to as "touch". The "scroll operation" is a type of touch operation, and refers to a series of operations of touching the touch display 21 and then sliding a finger or the like on the touch display 21 in a touching state. The scroll operation includes a drag and drop operation, a flick operation, and a swipe operation.

The touch display 21 has a display area. The display area is at least a part of the display of the touch display 21, and is an area for displaying a part of the virtual screen as a physical screen area. In the present description, the "virtual screen" refers to a graphic that the processor 23 generates on the virtual space by electronic calculation. The "physical screen area" refers to a part of the virtual screen displayed in the display area of the touch display 21. The configurations of the display area and the virtual screen will be described below with reference to another drawing.

The memory 22 is configured to store limit information and marker information. In the present embodiment, the memory 22 includes a primary memory and a secondary memory. The primary memory has a function of storing limit information and marker information in a volatile manner. The secondary memory has a function of storing a control processing program P20 in a nonvolatile manner. In the present embodiment, a dynamic random access memory (DRAM) is used as the primary memory, and a flash memory is used as the secondary memory. The limit information and the marker information stored in the primary memory may be stored in a nonvolatile memory such as an electronically erasable and programmable read only memory (Registered Trademark) (EEROM) when the memory 22 is powered off so as to be retained even when the memory is powered off, and may be restored from the EEPROM to the primary memory when the memory is powered on.

The control processing program P20 may be stored not in the secondary memory included in the memory 22 but in a remote server. In such a case, the control processing program P20 may be supplied from the server to the memory 22 via an optional wired or wireless transmission medium.

The processor 23 is configured to control the operation of the entire operation terminal 20. The processor 23 is, for example, a central processing unit (CPU), a graphics processing unit (GPU), or a combination of them. The processor 23 mainly executes control processing S20 of the operation terminal 20 by developing and executing the control processing program P20 stored in the memory 22 of the operation terminal 20. The control processing S20 executed by the processor 23 will be described below with reference to another drawing.

The communication interface 24 is configured to control transmission of various data from the operation terminal 20 and reception of various data by the operation terminal 20. In the present embodiment, a USB interface is used as the communication interface 24.

The operation terminal 20 is not limited to the smartphone, and is only required to be any terminal having the touch display 21. Examples of the operation terminal 20 other than the smartphone include a tablet personal computer (PC), a gimbal with a touch display, a laptop with a touch display, a personal digital assistant (PDA), a smart watch, and a touch panel digital signage.

The lens 10 is configured to form an image of a subject on an image sensor included in a camera. In the present embodiment, a zoom lens removably mounted to the camera is used as the lens 10. As shown in FIG. 1, the lens 10 includes a processor 11, the communication interface 12, and the lens optical system 30.

The processor 11 is configured to control the operation of the entire lens 10. The processor 11 mainly executes control processing S10 of the lens 10 by developing and executing a control processing program P10 stored in a memory of the lens 10 and receiving a command signal from the processor 23 of the operation terminal 20. In the present embodiment, a CP used as the processor 11. The control processing S10 executed by the processor 11 will be described below With reference to another drawing.

The communication interface 12 is configured to control transmission of various data from the lens 10 and reception of various data by the lens 10. In the resent embodiment, a USB interface is used as the communication interface 12.

The lens optical system 30 is an optical element group arranged on an optical axis OA passing through the subject. As shown in FIG. 1, the lens optical system 30 includes a focus group 31, a zoom group 32, and a diaphragm 33 as optical elements. In the lens optical system 30, the relative positional relationship among the focus group 31, the zoom group 32, and the diaphragm 33 is not limited to the positional relationship shown in FIG. 1, and can be appropriately modified.

The focus group 31 is an optical element for changing an in-focus position of the entire lens optical system 30 included in the lens 10. The focus group 31 changes the focus position in order to change the in-focus position. Here, the focus position means a position of at least one single lens included in the focus group 31 inside the lens optical system 30, and is distinguished from an in-focus position, which is a position in focus on the optical axis OA. Hereinafter, in the present description, the "focus position of the entire lens optical system 30 included in the lens 10" may be referred to as "focus of the lens optical system 30" or simply as "focus". In the present embodiment, the single lens included in the focus group 31 is driven along the optical axis QA, whereby focus is controlled.

The zoom group 32 is an optical element for changing an angle of view (that is, zoom magnification) of the entire lens optical system 30 included in the lens 10. Hereinafter, in the present description, the "angle of view of the entire lens optical system 30 included in the lens 10" may be referred to as "zoom of the lens optical system 30" or simply as "zoom". In the present embodiment, the single lens included in the zoom group 32 is driven along the optical axis OA, whereby zoom is controlled.

The diaphragm 33 is an optical element configured to define a light flux diameter of the entire lens optical system 30 included in the lens 10, thereby changing a diaphragm value of the entire lens optical system 30. Hereinafter, in the present description, the "diaphragm value of the entire lens optical system 30 included in the lens 10" may be referred to as "diaphragm of the lens optical system 30" or simply as "diaphragm". In the present embodiment, a diaphragm blade included in the diaphragm 33 is opened and closed in a direction orthogonal to the optical axis OA, whereby the diaphragm is controlled.

In the present description, "controlling the lens optical system 30" includes changing or maintaining any one or more of the states of the lens optical system 30. Examples of the state of the lens optical system 30 include focus, zoom, and diaphragm.

The lens optical system 30 is not limited to the configuration including all of the focus group 31, the zoom group 32, and the diaphragm 33 described above. In the present invention, the lens optical system 30 is only required to include one or more optical elements. Examples of optical element other than the focus group 31, the zoom group 32, and the diaphragm 33 include a variable neutral density (ND) filter. The variable ND filter is an optical element for changing a light reduction amount.

In the present invention, each of the focus group 31, the zoom group 32, and the diaphragm 33 is not limited to the above-described configuration. The focus group 31, the zoom group 32, and the diaphragm 33 are only required to include a configuration capable of changing the focus, the zoom, and the diaphragm, respectively, of the lens optical system 30. For example, the zoom group 32 is not limited to the configuration of an optical zoom that changes the zoom magnification by driving a sing lens, and may be the configuration of a digital zoom.

In the present invention, the lens 10 is not limited to the zoom lens having the above-described configuration. The lens 10 is only required to be configured to control at least one of focus, zoom, and diaphragm. In the present invention, the lens 10 may be removably mounted to the camera, or may be integrally mounted to the camera and non-removable from the camera. Examples of the lens 10 removably mounted to the camera include a zoom lens and a single focus lens. Examples of the camera in which the lens 10 is movably mounted to the camera include a camera built in a smartphone or a tablet PC, a compact digital camera, a video camera, a surveillance camera, a far infrared camera, and a microscope camera.

(Control Processing of Lens System)

Control processing S100 of the lens system 100 will be described below. The control processing S100 is processing of controlling a part of the virtual screen to be displayed on the touch display 21 in accordance with a scroll operation of the user on the touch display 21, and controlling the lens optical system 30 in such a manner that focus, zoom, or diaphragm of the lens optical system 30 works with a part of the virtual screen to be displayed on the touch display 21.

In the present embodiment, which of the focus, the zoom, and the diaphragm is controlled in the control processing S100 is determined by the processor 23 of the operation terminal 20 in accordance with a mode selected in advance and input to the operation terminal 20 by the user. The control processing S100 described below is processing in a case where the user selects a focus control mode in advance and the focus is controlled. However, in the present embodiment, the control processing S100 is not limited to the processing of controlling the focus, and in a case where the user selects in advance a zoom control mode or a diaphragm control mode, the corresponding zoom or diaphragm is controlled.

In the present invention, the manner of selecting the control target from the focus, the zoom, and the diaphragm is not limited to the manner corresponding to the mode selection by the user. The control target can be selected by an optional algorithm.

In the present embodiment, the control processing S100 includes control processing S10 of the lens 10 and control processing S20 of the operation terminal 20. The processor 23 of the operation terminal 20 executes the control processing S20, and in conjunction with the control processing S20, the processor 11 of the lens 10 executes the control processing S10, whereby the control processing S100 is executed.

(Control Processing of Operation Terminal)

Figure 2:
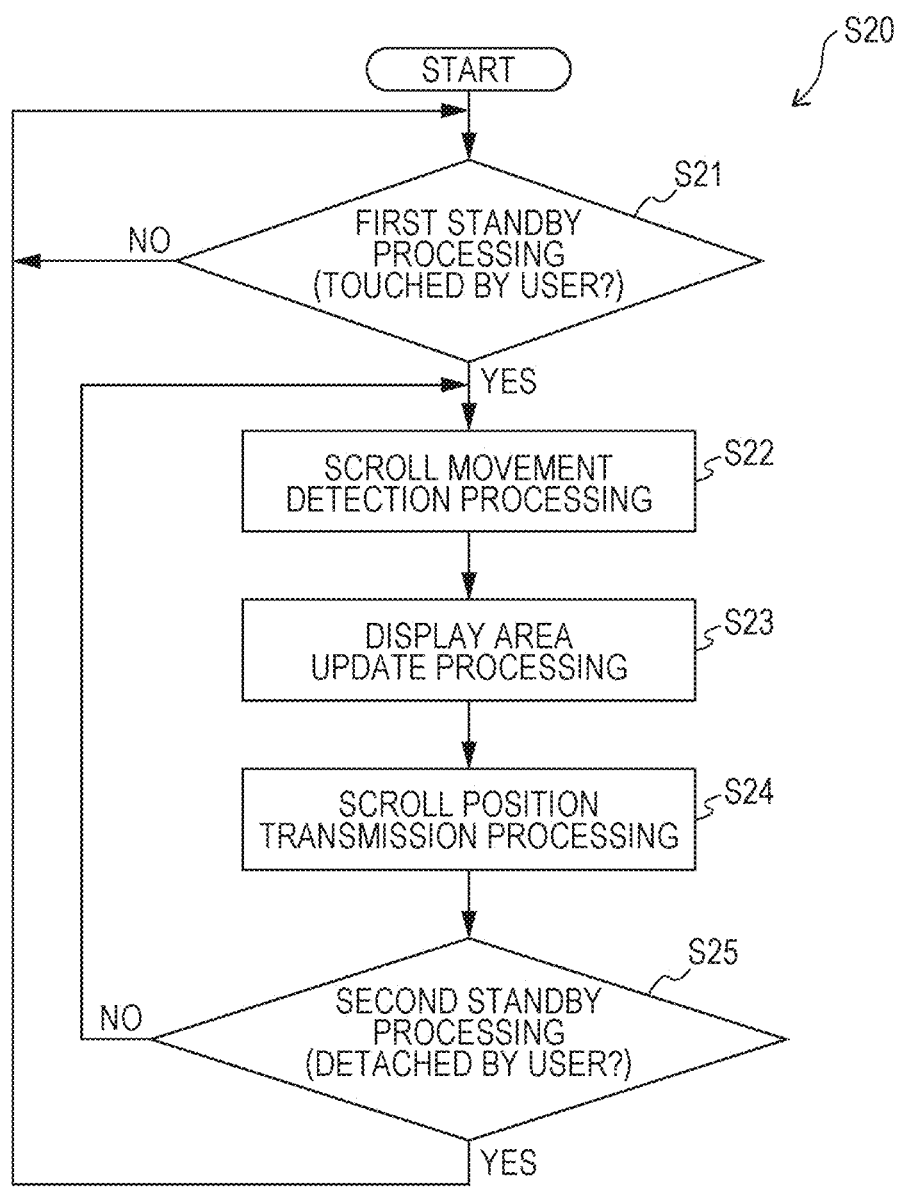
FIG. 2 is a flowchart showing a flow of control processing executed by a processor of an operation terminal shown in FIG.

The control processing S20 of the operation terminal 20 will be described with reference to FIG. 2. FIG. 2 is a flowchart showing a flow of the control processing S20 executed by the processor 23 of the operation terminal 20 shown in FIG. 1. The control processing S20 is processing of controlling a part of the virtual screen to be displayed on the touch display 21 in accordance with a scroll operation of the user on the touch display 21, and transmitting a command signal to the processor 11 of the lens 10 in such a manner that focus, zoom, or diaphragm of the lens optical system 30 works with a part of the virtual screen to be displayed on the touch display 21.

As shown in FIG. 2, the control processing S20 includes first standby processing S21, scroll movement detection processing S22, display area update processing S23, scroll position transmission processing S24, and second standby processing S25. In the present embodiment, these processing are executed by the processor 23 of the operation terminal 20 serving as a processing subject.

(First Standby Processing)

The first standby processing 321 is processing of waiting for touching by the user on the touch display 21. While the touch sensor of the touch display 21 does not detect touching by the user ("NO"), the processor 23 loops the first standby processing S21. When the touch sensor of the touch display 21 detects touching by the user and transmits, to the processor 23, a signal notifying the touched position on the touch display 21 as a reference position ("YES"), the processor 23 starts subsequent the scroll movement detection processing S22.

(Scroll Movement Detection Processing)

The scroll movement detection processing S22 is processing of detecting the length and direction of the scroll operation performed by the user on the touch display 21. In the scroll movement detection processing S22, the touch sensor of the touch display 21 transmits, to the processor 23, a signal for notifying the currently touched position of the touch display 21 as a current position. Next, the processor 23 detects, as the length and direction of the scroll movement, the length and direction from the reference position to the current position that have been received in the first standby processing S21 along a predetermined direction. For example, in the scroll operation, the linearly longer the user slides a finger or the like on the touch display 21 from the position (reference position) where the user first touches on the touch display 21, the larger length the processor 23 detects.

(Display Area Update Processing)

The display area update processing S23 is processing of updating, in accordance with the scroll movement, the graphics user interface (GUI) displayed in the display area. For example, the processor 23 determines an area in the virtual screen to be displayed as a physical screen area in accordance with the reference area and the scroll movement with, as the reference area, the area displayed as the physical screen area in the first standby processing 221. Then, the processor 23 displays the determined area in the display area as a physical screen area. Through this series of processing, the processor 23 implements the display area update processing S23.

In the present embodiment, the processor 23 updates the display area such that the GUL displayed as the physical screen area at the reference position in the first standby processing S21 follows a touch position (current position) by the user. The processor 23 updates the display area such that the display area cannot display the outside from the inside beyond the end of the virtual screen. For example, when the length of the scroll movement is larger than a predetermined value, the processor 23 updates the display area such that the end of the display area overlaps the end of the virtual screen.

(Scroll Position Transmission Processing)

The scroll position transmission processing S24 is processing of transmitting information indicating a scroll position as a command signal to the processor 11 of the lens 10. The processor 23 calculates coordinates of the physical screen area in the virtual screen as the scroll position. Next, the processor 23 transmits, as a command signal, information indicating the scroll position to the processor 11 of the lens 10 via the communication interface 12 of the lens 10 and the communication interface 24 of the operation terminal 20.

(Second Standby Processing)

The second standby processing S25 is processing of waiting for an operation (detach operation) of releasing the finger or the like that the user has being touching on the touch display 21 from the touch display 21. While the touch sensor of the touch display 21 does not detect detaching by the user ("NO"), the processor 23 loops the scroll movement detection processing S22, the display area update processing S23, the scroll position transmission processing S24, and the second standby processing S25. Therefore, while the user continues the scroll operation without performing the detach operation, the processor 23 continuously executes the scroll movement detection processing S22, the display area update processing 323, and the scroll position transmission processing S24. When the touch sensor of the touch display 21 detects the detaching by the user and transmits a signal notifying the detaching to the processor 23 ("YES"), the processor 23 returns the control processing S20 to the first standby processing S21.

(Control Processing of Lens)

Figure 3:
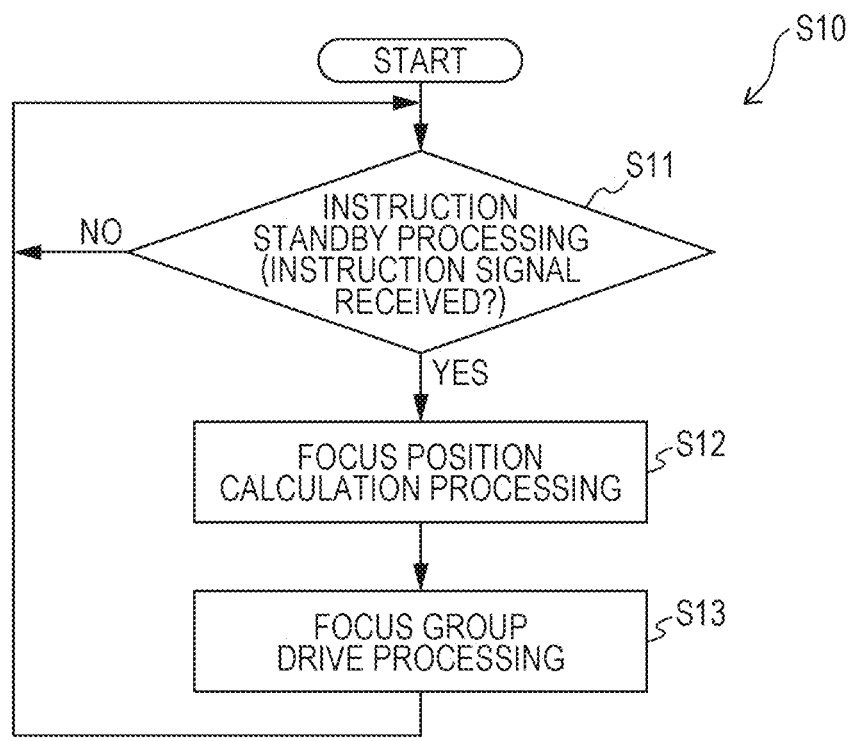
FIG. 3 is a flowchart showing a flow of control processing executed by a processor of a lens shown in FIG. 1.

The control processing S10 of the lens 10 will be described with reference to FIG. 3. FIG. 3 is a flowchart showing a flow of the control processing S10 executed by the processor 11 of the lens 10 shown in FIG. 1. The control processing 810 is processing of controlling the lens optical system 30 in such a manner that focus, zoom, or diaphragm of the lens optical system 30 works with a part of the virtual screen to be displayed on the touch display 21.

As shown in FIG. 3, the control processing S10 includes command standby processing S11, focus position calculation processing S12, and focus group drive processing S13. In the present embodiment, these processing are executed by the processor 11 of the lens 10 serving as a processing subject.

(Command Standby Processing)

The command standby processing S11 is processing of waiting for information indicating a scroll position as a command signal from the processor 23 of the operation terminal 20. The processor 11 of the lens 10 loops the command standby processing S11 while not receiving the command signal ("NO"). Upon receiving the command signal ("YES"), the processor 11 starts subsequent focus position calculation processing S12.

(Focus Position Calculation Processing)

The focus position calculation processing S12 is processing of calculating, as a target for moving the focus group in the subsequent focus group drive processing 813, a focus position with reference to information indicating a scroll position. In the present embodiment, the correspondence relationship between the scroll position and the focus position is defined by the control processing program P10 stored in the memory of the lens 10. The processor 11 calculates the focus position on the basis of the control processing program P10 with reference to the information indicating the scroll position.

In the present embodiment, the scroll position and the focus position have a linear correlation relationship with each other, and thus the change amount in the scroll position and the change amount in the focus position are directly proportional to each other. However, in the present invention, the correspondence relationship between the scroll position and the focus position is not limited to such a correlation, and may be appropriately changed by a user's operation. For example, the correspondence relationship between the scroll position and the focus position may be a relationship in which the change amount of the scroll position and the change amount of the in-focus position are directly proportional to each other.

(Focus Group Drive Processing)

The focus group drive processing S13 is processing of driving the focus group 31. The processor 11 transmits a command signal to a motor associated with the single lens included in the focus group 31, and drives the motor, thereby driving the single lens. This achieves, in the focus group 31, the focus position calculated in the focus position calculation processing S11.

Upon completing the driving of the single lens, the processor 11 returns the control processing S10 to the command standby processing S11.

(Configurations of Operation Terminal and Virtual Screen)

Figure 4:
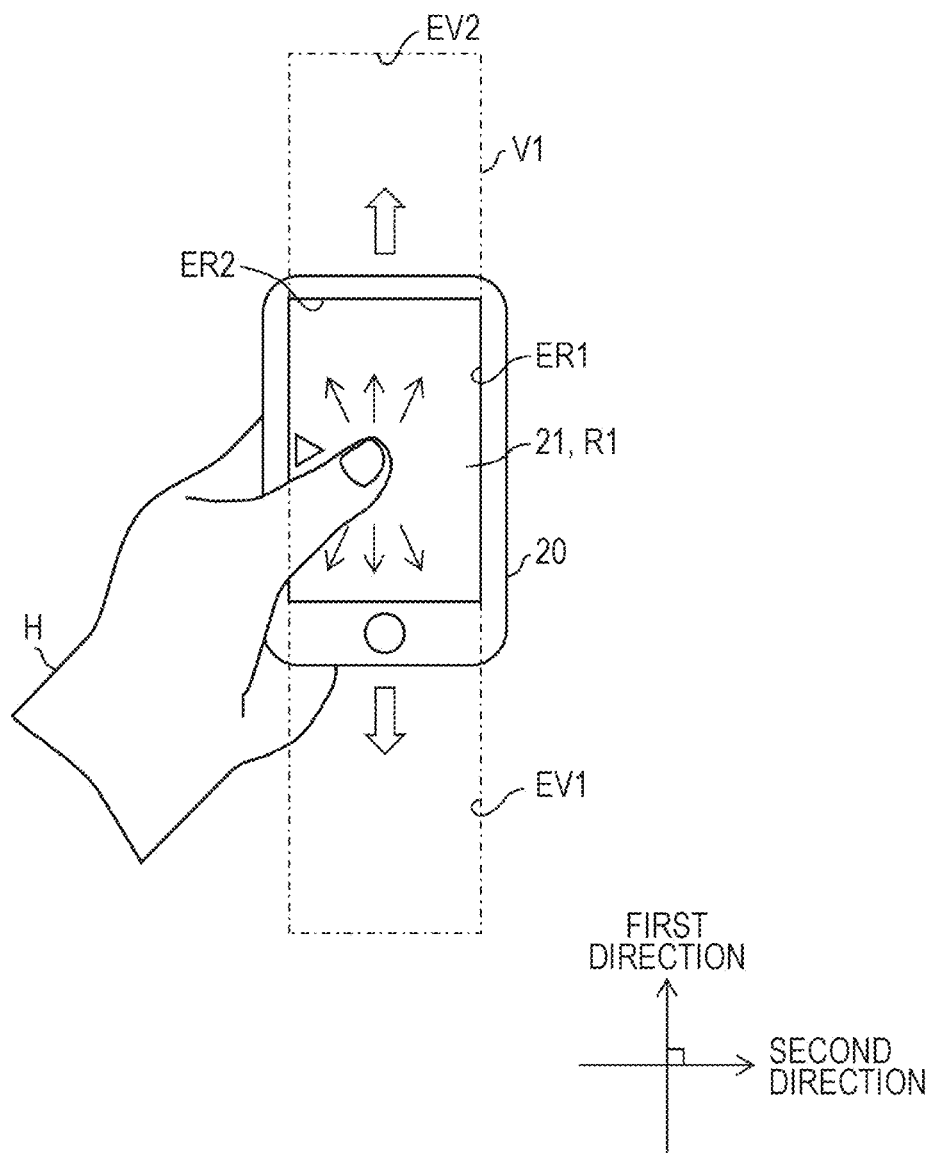
FIG. 4 is a schematic diagram showing a configuration of an operation terminal and a virtual screen in the lens system shown in FIG. 1.

The virtual screen in the lens system 100 will be described with reference to FIG. 4. FIG. 4 is a schematic diagram showing the configurations of the operation terminal 20 and a virtual screen V1 in the lens system 100 shown in FIG. 1. In FIG. 4, a vertical direction from the lower side to the upper side is defined as a first direction, and a horizontal direction from the left side to the right side is defined as a second direction.

As shown in FIG. 4, the touch display 21 of the operation terminal 20 has a display area R1 that spreads over the entire display of the touch display 21. In the display area R1, a part of the virtual screen V is displayed as a physical screen area. The shape of the display area R1 is a rectangle including a first side ER1 parallel to the first direction and a second side ER2 parallel to the second direction.

In the present embodiment, the shape of the virtual screen V1 is a rectangle including a first side EV1 parallel to the first direction and a second side EV2 parallel to the second direction. The first side EV1 is longer than the first side ER1 of the display area R1, and the second side EV2 has the same length as that of the second side ER2 of the display area R1.

In the present invention, the configuration of the virtual screen V1 is not limited to the configuration of the present embodiment in which the second side EV2 has the same length as that of the second side ER2 of the display area R1 The second side EV2 of the virtual screen V1 may be shorter or longer than the second side ER2 of the display area R1, for example.

In the Present embodiment, the user can control the lens system 100 by performing a scroll operation of inputting, to the touch display 21, an operation for moving the virtual screen V1 in a direction parallel to the first direction. Here, the scroll operation needs not be parallel to the first direction, and it is sufficient that the scroll movement direction at least partially includes a component parallel to the first direction.

(Relationship Between Scroll Operation and Virtual Screen)

Figure 5:
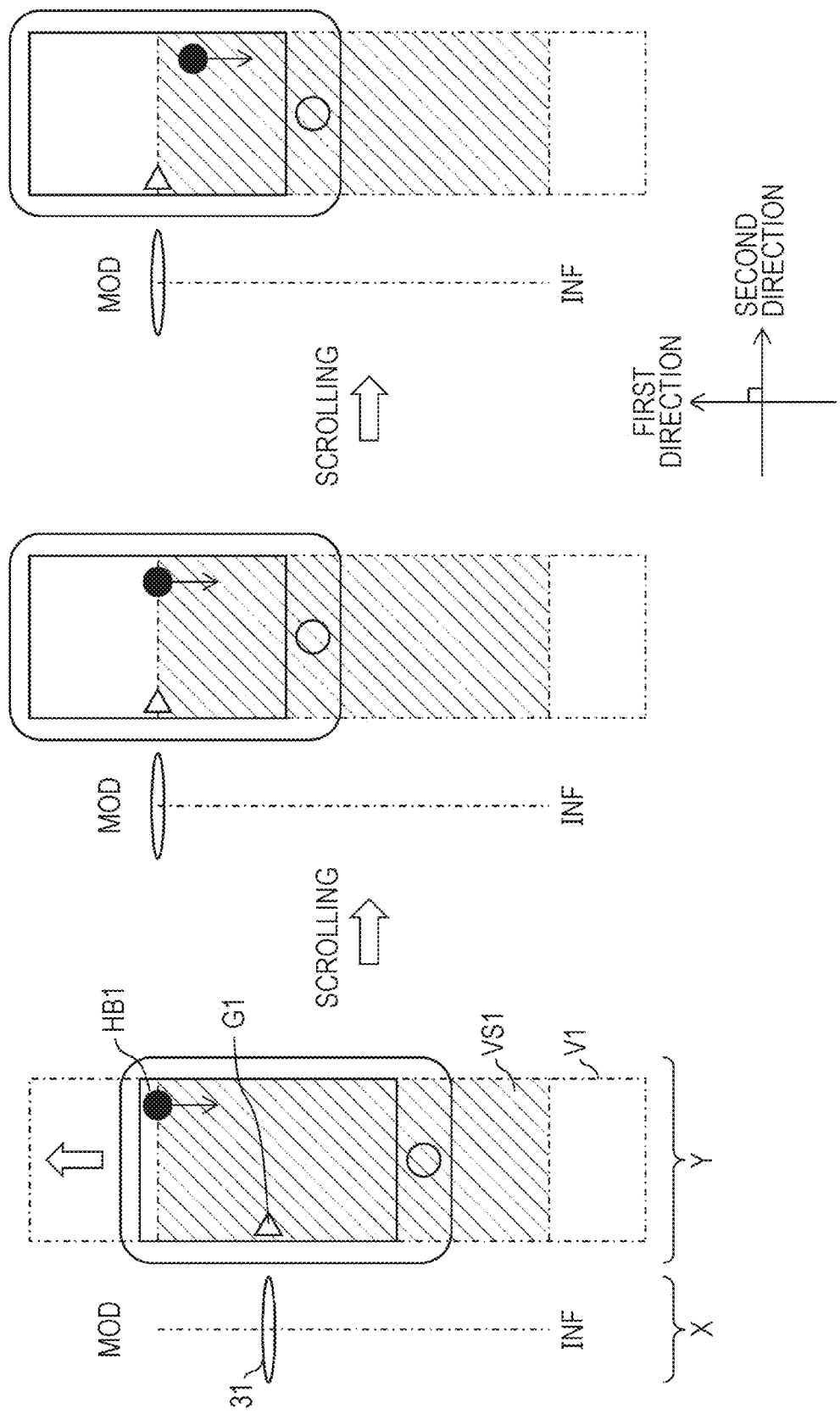
FIG. 5 is a schematic diagram showing a relationship between control of a focus group and configurations of the operation terminal and the virtual screen in accordance with a scroll operation in the lens system shown in FIG. 1.

A scroll operation in the lens system 100 will be described with reference to FIG. 5. FIG. 5 is a schematic diagram showing a relationship between control of the focus group 31 and the configurations of the operation terminal 20 and the virtual screen V1 in accordance with a scroll operation in the lens system 100 shown in FIG. 1.

In FIG. 5, X is a schematic diagram showing a focus position, which indicates that the upper the focus group 31 is positioned, the closer the focus position is to a proximal end (MOD), and the lower the focus group 31 is positioned, the closer the focus position is to an infinity end (INF). In the present invention the positional relationship between the proximal end (MOD) and the infinity end (INF) is not limited to the relationship indicated by X, and may be appropriately changed.

In FIG. 5, Y is a schematic diagram showing a relationship between a touch position HB1 by the user on the touch display 21 and the virtual screen V1. A pointer G1 is a GUI displayed by the processor 23 at a fixed position in the display area R1, and notifies the user of the coordinates of the physical screen area in the virtual screen. The pointer G1 is displayed at a fixed position in the display area R1 independently of which part of the virtual screen V1 to be displayed in the display area R1 as the physical screen area.

A pointer scroll area VS1 is an area obtained by expanding, in the virtual screen V1, an area of the virtual screen V1 that can overlap with the pointer G1 along the second direction, and is a part of the virtual screen V1. The display area R1 is controlled by the processor 23 so as not to display the outside of the virtual screen V1. Therefore, the pointer scroll area VS1 is limited to a part of the virtual screen V1.

As shown in the left figure and the center figure of FIG. 5, when the touch position HB1 moves downward, the processor 23 updates the display area R1 such that the GUI displayed at the touch position HB1 moves following the touch position HB1. Therefore, in FIG. 5, with reference to the virtual screen V1, the part displayed as the physical screen area in the display area R1 moves upward. The processor 11 controls the lens optical system 30 in such a manner that the focus position approaches the proximal end (MOD) in conjunction with the control of the display area R1. Here, the following of the GUI to the touch position HB is only required to along a direction parallel to the first side EV1 of the virtual screen V1.

As shown in the center figure and the right figure of FIG. 5, the display area R1 is controlled so that the display area R1 does not go beyond the virtual screen V1 from the inside to the outside. The upper end of the pointer scroll area VS1 corresponds to the proximal end of the focus position, and the lower end of the pointer scroll area VS1 corresponds to the infinity end of the focus position. Therefore, even when the user inputs a scroll operation in which the length of the scroll movement is larger than the predetermined value, the conjunction between the control of display area R1 and the control of the lens optical system 30 is maintained.

(Additional Control Processing of Lens System)

In the present embodiment, the control processing S100 of the lens system 100 further includes sensitivity adjustment processing S30, display restriction processing S40, and marker processing S50. Each of the sensitivity adjustment processing S30, the display restriction processing S40, and the marker processing S50 is executed by the processor 11 and the processor 23 in response to a user's operation as processing independent of the control processing S10 and the control processing S20. Here, the user's operation is not limited to the scroll operation. Examples of user's operation include a touch operation on a GUI such as a slider and a button displayed on the touch display 21, and an operation on a physical switch included in the operation terminal 20.
(Sensitivity Adjustment Processing)

Figure 6:
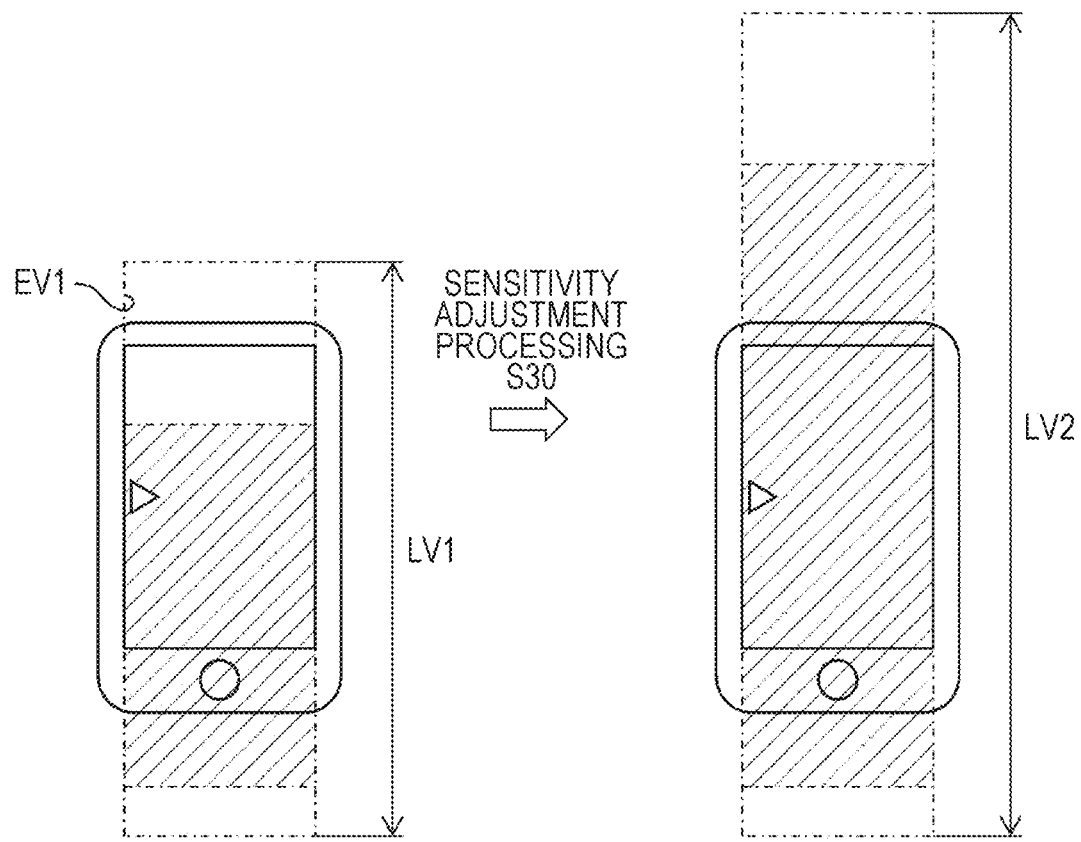
FIG. 6 is a schematic diagram showing a configuration of a virtual screen in sensitivity adjustment processing executed by the lens system shown in FIG. 1.

The sensitivity adjustment processing 230 is processing of setting the length of the first side EV1 of the virtual screen V1 in response to the user's operation. The sensitivity adjustment processing S30 will be described with reference to FIG. 6. FIG. 6 is a schematic diagram showing the configuration of the virtual screen V1 in the sensitivity adjustment processing S30 executed by the lens system 100 shown in FIG. 1.

In the sensitivity adjustment processing S30, the processor 23 of the operation terminal 20 sets the length of the first side EV1 of the virtual screen V1 in response to the user's operation. For example, as shown in FIG. 6, the processor 23 changes the length of the first side EV1 from the length LV1 to the length LV2 in response to the user's operation Due to this, the length of the pointer scroll area VS1 along the first direction also changes in conjunction with the length of the first side EV1. Here, the upper end and the lower end of the pointer scroll area VS1 are defined by the control processing program P10 so as to correspond to one end and the other end of the movable range of an optical element included in the lens optical system 30. Therefore, by changing the length of the first side EV1, the adjustment of operation sensitivity in the control processing S10 and the control processing S20 is implemented.

For example, in FIG. 6, in order to drive the optical element included in the lens optical system 3 from one end to the other end of the movable range in the control processing S10, the user inputs at least a scroll operation of the length of the pointer scroll area VS1 along the first direction. Therefore, the larger the length LV2 is made by the sensitivity adjustment processing S30, the longer the length of the scroll operation required for constantly driving the optical element becomes, and thus the operation sensitivity is low. On the other hand, the smaller the length LV2 is made by the sensitivity adjustment processing S30, the higher the operation sensitivity is. The lower the operation sensitivity is, the more finely the user can operate the lens system 100, and the higher the operation sensitivity is, the more dynamically the user can operate the lens system 100.
(Display Restriction Processing)

Figure 7:
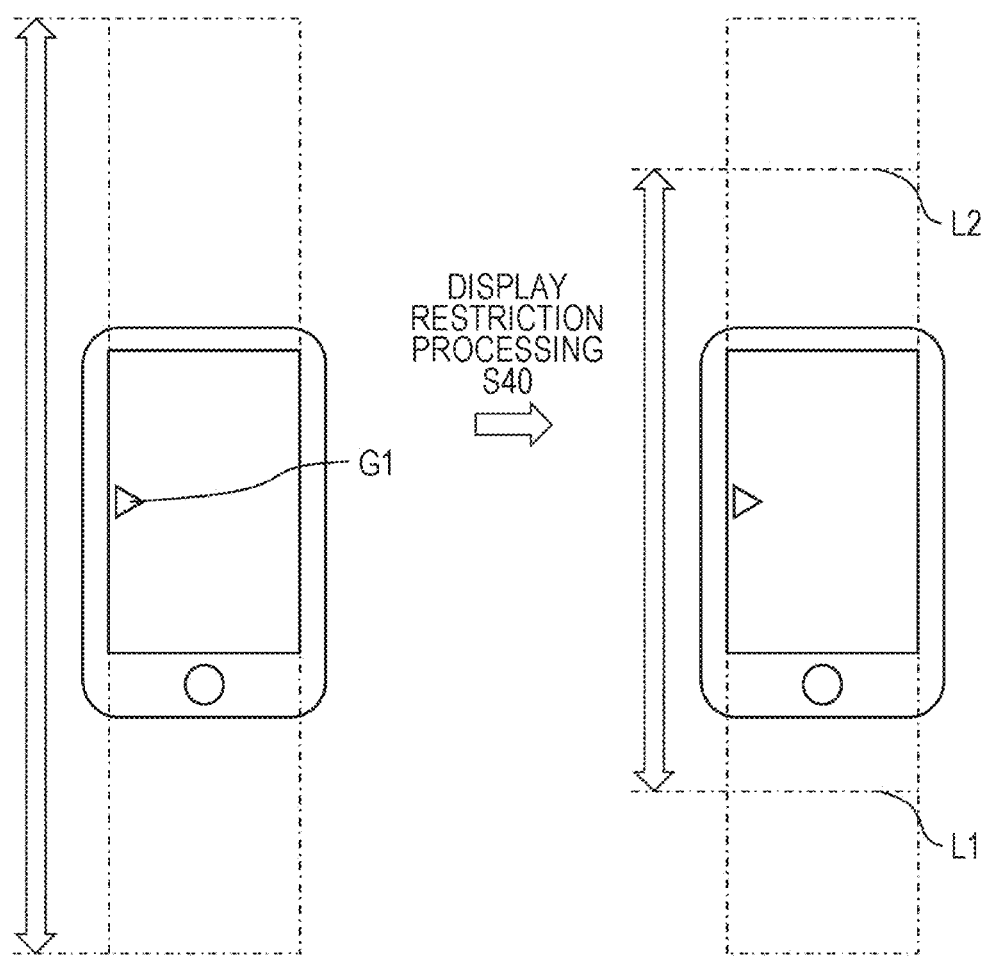
FIG. 7 is a schematic diagram showing a configuration of a virtual screen in display restriction processing executed by the lens system shown in FIG. 1.

The display restriction processing S40 is processing of restricting the part of the virtual screen V1 that can be displayed on the touch display 21 to a part of the virtual screen V1 on the basis of the information indicating the restriction end set by the user. The display restriction processing S40 will be described with reference to FIG. 7. FIG. 7 is a schematic diagram showing the configuration of the virtual screen V1 in the display restriction processing S40 executed by the lens system 100 shown in FIG. 1.

In the display restriction processing S40, as shown in FIG. 7, the processor 23 of the operation terminal 20 sets a first restriction end L1 and the second restriction end 2 to the virtual screen V1 in response to the user's operation. The processor 23 writes, to the memory 22 as limit information, information indicating the positions of the first restriction end L1 and the second restriction end L2.

The display restriction processing S40 is partially executed by the processor 23 concurrently with the control processing S20 of the operation terminal 20 described above. For example, with reference to the limit information in the display restriction processing S40, the processor 23 controls the display area R1 in the display area update processing S23 so that the pointer G1 is restricted between the first restriction end L1 and the second restriction end L2. In other words, the display restriction processing S40 restricts the part of the virtual screen V1 that can be displayed on the touch display 21 to a part of the virtual screen V1.

Here, the upper end and the lower end of the pointer scroll area VS1 are defined by the control processing program P10 so as to correspond to one end and the other end of the movable range of an optical element included in the lens optical system 30. Therefore, by restricting the part that can be displayed on the touch display 21 in the control processing S20 to a part of the virtual screen V1, the movable range of the optical element in the control processing S10 is restricted to a range corresponding to between the first restriction end 11 and the second restriction end L2.
(Marker Processing)

The marker processing S50 is processing of writing information indicating a part of the virtual screen V1 into the memory 22 as marker information in response to the user's operation, or controlling the lens optical system 30 with reference to the written marker information in response to the user's operation. The marker processing S50 includes marker writing processing S51, marker reading processing 352, and marker stop processing S53. Each of the marker writing processing S51, the marker reading processing S52, and the marker stop processing S53 is executed by the processor 11 and the processor 23 in response to the user s operation as processing independent from one another.
(Marker Writing Processing)

Figure 8:
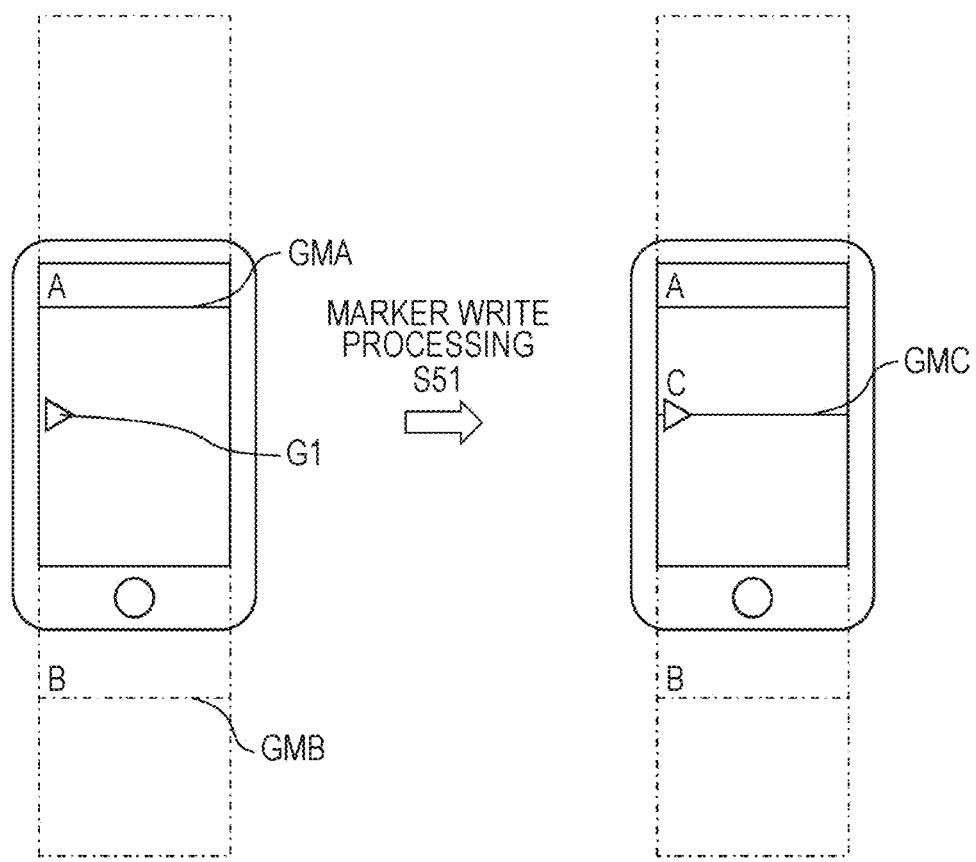
FIG. 8 is a schematic diagram showing a configuration of a virtual screen in a marker writing processing executed by the lens system shown in FIG.

The marker writing processing S51 is processing of writing information indicating a part of the virtual screen V1 currently displayed on the touch display 21 into the memory 22 as marker information in response to the user's operation, and generating a marker in the virtual screen V1 on the basis of the marker information. The marker writing processing S51 will be described with reference to FIG. 8. FIG. 8 is a schematic diagram showing the configuration of the virtual screen V1 in the marker writing processing S51 executed by the lens system 100 shown in FIG. 1.

In the present embodiment, a part of the virtual screen V1 currently displayed on the touch display 21 is represented with reference to the pointer G. In the marker writing processing S51, the processor 23 of the operation terminal 20 writes, into the memory 22, information indicating the position of the virtual screen V1 currently displayed overlapping the pointer G1 as marker information IMC in response to the user's operation Along with the writing, the processor 23 generates marker GMC associated with the marker information IMC at a position overlapping the pointer G1 in the virtual screen V1 as shown in FIG. 8. The marker GMC is a GUI that notifies the user of the position of the virtual screen V1 where a "C" marker is provided.

In the left figure of FIG. 8, the two markers GMA and GMB are GUIs that are associated with the marker information IMA and IMB stored in the memory 22, respectively, and notify the user of the positions of the virtual screen V1 where the "A" marker and the "B" marker are generated, respectively. The marker GMA positioned in the physical screen area of the virtual screen V1 is displayed as a GUI in the display area R1. On the other hand, the marker GMB positioned outside the physical screen area in the virtual screen V1 is not displayed in the display area R1.

(Modification of Marker Writing Processing)

In the present embodiment, the marker writing processinq S51 is executed by writing, as marker information, information indicating the position of the virtual screen V1 currently displayed overlapping the pointer G1. However, the present invention is not limited to such configuration. The processor 23 may write the marker information by appropriately referring to the information in response to the user's operation. For example, the processor 23 may refer to the marker information with reference to information indicating a position where the user touches on the touch display 21.

(Marker Reading Processing)

Figure 9:
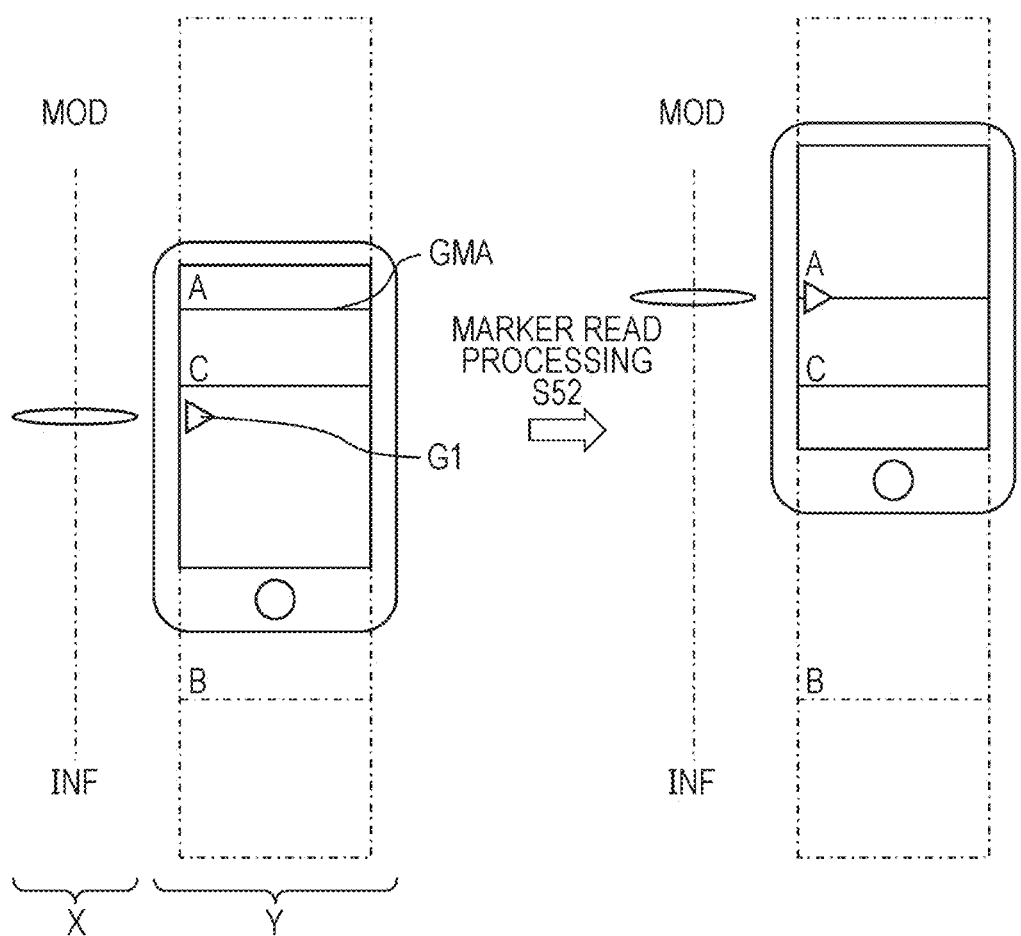
FIG. 9 is a schematic diagram showing a configuration of a virtual screen in marker reading processing executed by the lens system shown in FIG. 1.

The marker reading s processing of restoring, on the basis of the marker information, the part of the virtual screen V1 to be displayed on the touch display 21, and controlling the lens optical system 30. The marker reading processing S52 will be described with reference to FIG. 9. FIG. 9 is a schematic diagram showing the configuration of the virtual screen V1 in the marker reading processing S52 executed by the lens system 100 shown in FIG. 1.

In the marker reading processing S52, the processor 23 of the operation terminal 20 reads the marker information stored in the memory 22 in response to the user's operation. In FIG. 9, it is assumed that the processor 23 reads, on the basis of the user's operation, the marker information IMA among the marker information IMA, IMB, and IMC stored in the memory 22. Next, as shown in FIG. 9, the processor 23 controls the display area R1 so that the marker GMA associated with the marker information IMA and the pointer G1 overlap. Due to this, when the marker information IMA is written in the memory 22, the part of the virtual screen V1 displayed as the physical screen area in the display area R1 is displayed in the display area R1 again. In other words, the display area R1 is restored.

The processor 23 transmits, to the processor 1 of the lens 10, information indicating the scroll position as a command signal. Upon receiving the command signal, the processor 11 controls the lens optical system 30 in accordance with the command signal. The command signal reception by the processor 11 and control of the lens optical system 30 are executed in a similar manner to the control processing S10 of the lens 10 described above.

(Marker Stop Processing)

Figure 10:
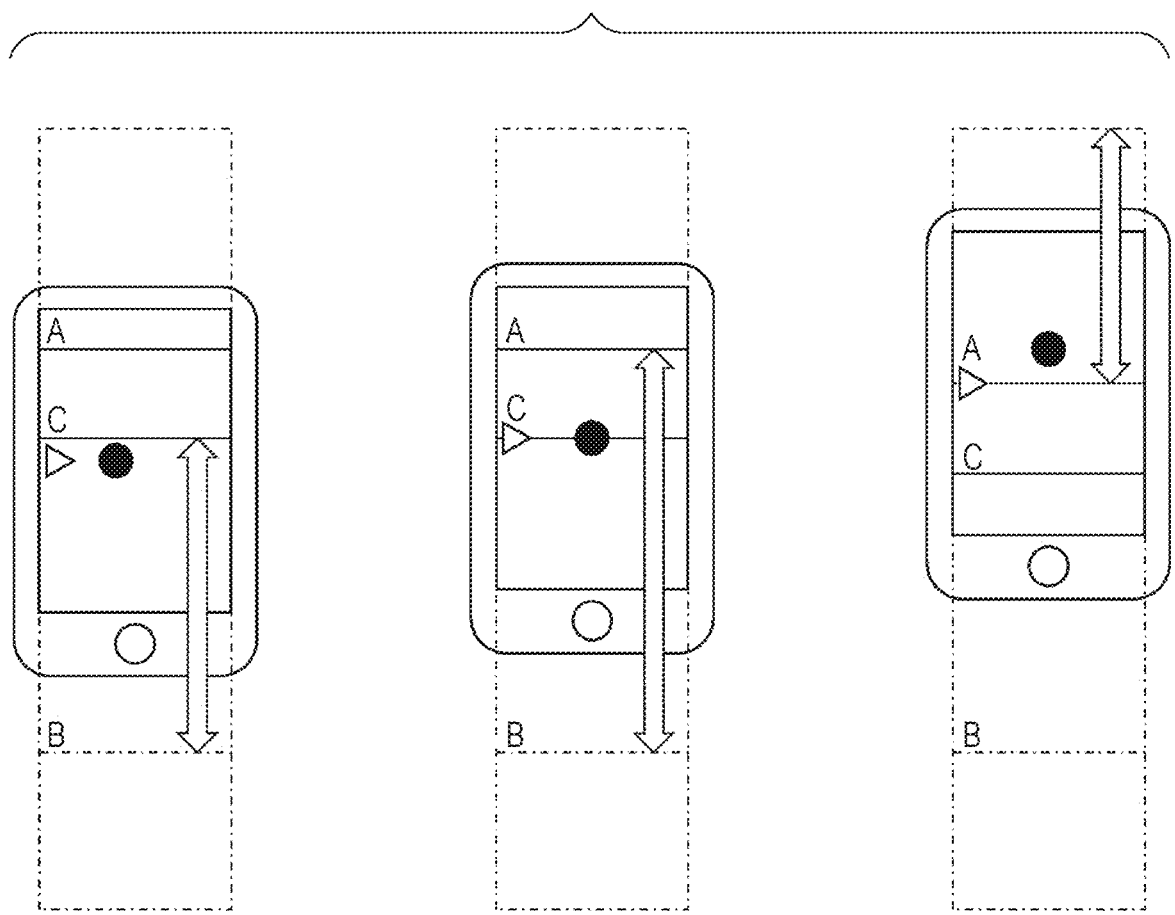
FIG. 10 is a schematic diagram showing a configuration of a virtual screen in marker stop processing executed by the lens system shown in FIG. 1.

The marker stop processing 853 is processing of restricting the part of the virtual screen V1 that can be displayed on the touch display 21 to a part of the virtual screen V1 on the basis of the marker information and the information indicating the reference position or the part displayed at the time point of touching. The marker stop processing S53 will be described with reference to FIG. 10. FIG. 10 is a schematic diagram showing the configuration of the virtual screen V1 in the marker stop processing 853 executed by the lens system 100 shown in FIG. 1.

The marker stop processing S53 is at least partially executed by the processor 23 concurrently, with the control processing S20 of the operation terminal 20 described above. For example, with reference to the marker information stored in the memory 22 in the marker stop processing S53, the processor 23 controls the display area R1 in the display area update processing S23 so that the pointer G1 is restricted to a part of the virtual screen V1. In other words, the marker stop processing 853 restricts the part of the virtual screen V1 that can be displayed on the touch display 21 to a part of the virtual screen V1.

Here, in the marker stop processing 853, further with reference to, in addition to the marker information, the information indicating the position (reference position) touched by the user in the first standby processing 821 or the information indicating the part (scroll position) displayed on the touch display at the time point of touching, the processor 23 determines a part of the virtual screen V1 where the pointer G1 is restricted.

A case where the processor 23 refers to information indicating the reference position will be described. For example, as shown in the left figure of FIG. 10, when the reference position is in between the two markers GMB and GMC, the processor 23 determines that the part of the virtual screen V1 on which the pointer G1 is restricted is in between the two markers GMB and GMC. As shown in the center figure of FIG. 10, when the reference position is on the marker GMAC, the processor 23 determines that the part of the virtual screen V1 on which the pointer S1 is restricted is in between the two markers GA and GMB positioned so as to hold the marker GMC. As shown in the right figure of FIG. 10, when the reference position is in between the marker GMA closest to the end of the virtual screen among one or more markers and the end, the processor 23 determines that the part of the virtual screen V1 on which the pointer G1 is restricted is in between the end and the marker GMA.

A case where the processor 23 refers to information indicating the scroll position will be described. For example, in a case where the scroll position at the time point of touch is in between the two markers GMB and GMC, the processor 23 determines that the part of the virtual screen V1 on which the pointer G1 is restricted is in between the two markers GMB and GMC, similarly to the case of referring to the reference position. Also in other cases, the processor 23 executes the marker stop processing S53 similarly to the case of referring to the reference position.

(Modification of Marker Stop Processing)

Figure 11:
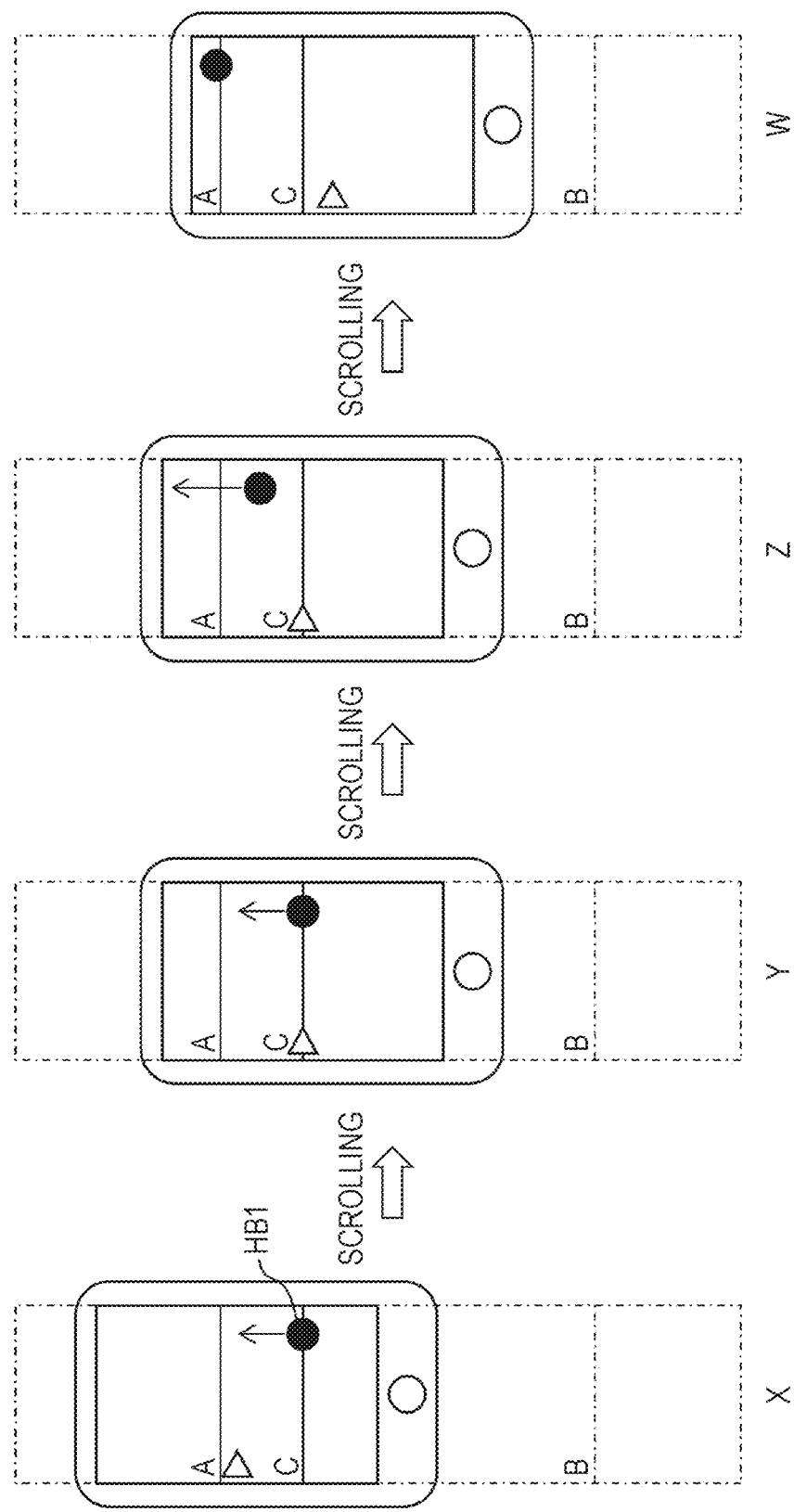
FIG. 11 is a schematic diagram showing a configuration of a virtual screen in a modification of the marker stop processing executed by the lens system shown in FIG. 1.

The marker stop processing S53 according to one embodiment of the present invention is not limited to the above-described processing. As a modification, the marker stop processing 353 may be processing of temporarily restricting the part of the virtual screen V1 that can be displayed on the touch display 21 to a part of the virtual screen V on the basis of the marker information and the information indicating the reference position. A modification of the marker stop processing S53 will be described with reference to FIG. 11. FIG. 11 is a schematic diagram showing the configuration of the virtual screen V1 in a modification of the marker stop processing S53 executed by the lens system 100 shown in FIG. 1.

As shown in FIGS. 11X and 11Y, when the touch position HB1 moves upward, the processor 23 controls the display area R1 such that the GUI displayed at the touch position HB1 moves following the touch position HB1. As shown in FIGS. 11Y and 11Z, when the touch position HB1 moves to a position where the pointer G1 overlaps the marker GMC, the processor 23 temporarily stops the GUI from following the touch position HB1. Accordingly, even when the touch position HB1 moves upward, the GUI does not change. When the touch position HB1 further moves upward and the length of the scroll movement exceeds a predetermined value, the processor 23 restarts following of the GUI to the touch position HB1 as shown in FIGS. 11Z and 11W.

Operations and Effects of First Embodiment

In the present embodiment, the lens optical system 30 is controlled such that the focus group 31, the zoom group 32, or the diaphragm 33 of the lens optical system 30 works with the part (physical screen area) of the virtual screen V1 to be displayed in the display area R1 of the touch display 21. In the present embodiment, the user can operate the lens optical system 30 by the scroll operation on the touch display 21. Therefore, the operation of the lens system 100 is simple. Furthermore, since the lens optical system 30 is operated by the scroll operation, which is a linear operation, high linearity is achieved between the scroll operation and the control of the lens optical system 30. Since there is no need to include equipment such as a belt, a gear, and a ring sensor in the path for transmitting the user's operation to the lens optical system 30, there is no or less control delay until gear driving, delay due to backlash of the gear, and delay until operation detection by the ring sensor. The lens system 100 is simple in configuration, light in weight, and easy in installation. Therefore, the lens system 100 is low in delay. Furthermore, the user can operate the lens optical system 30 while grasping the state of the lens optical system 30 by visually Observing the display area R1. Therefore, the lens system 100 can accurately control the lens optical system 30.

In the present embodiment, the display area R1 and the virtual screen V1 are rectangular. The first side EV1 of the virtual screen V1 along the first direction is longer than the first side ER1 of the display area R1 along the first direction, and the scroll operation is an operation for moving the virtual screen V1 in a direction parallel to the first direction. Therefore, since the part of the virtual screen V1 to be displayed in the display area R1 can be controlled along the direction of the scroll operation input by the user, the user can more intuitively grasp the state of the lens optical system 30 from the display area R1.

In the present embodiment, the length of the first side of the virtual screen is set in response to the user's operation. Since each end of the pointer scroll area VS1, which is a part of the virtual screen V1, corresponds to the movable range of the optical element of the lens optical system 30, the user can change the operation sensitivity by changing the length of the first side. Since the user can change the operation sensitivity without replacing equipment such as a gear, the operation is simple.

In the present embodiment, the part of the virtual screen vi that can be displayed in the display area R1 is restricted to a part of the virtual screen V1 on the basis or information (limit information) indicating the position of the restriction end set by the user. Since the lens optical system 30 is controlled so as to work with the part of the virtual screen V1 to be displayed in the display area R1, the movable range of the optical element of the lens optical system 30 can be restricted by restricting the displayable part. Therefore, the user can control the lens optical system 30 more accurately. An erroneous operation caused by a manual operation is reduced.

In the present embodiment, the processor 23 writes information indicating the part of the virtual screen V1 currently displayed in the display area R1 into the memory as marker information in response to the user's operation, and generates a marker in the virtual screen V1 on the basis of the marker information. Therefore, the user can operate the lens optical system 30 more accurately by grasping, as a mark, the marker displayed in the display area R1 in association with the marker information.

In the present embodiment, the part of the virtual screen V1 that can be displayed in the display area R1 is restricted to a part of the virtual screen on the basis of the marker information and the information indicating the reference position or the information indicating the scroll position. Therefore, since the marker also functions as a restriction end in the virtual screen V1, the user can control the lens optical system 30 more accurately. An erroneous operation caused by a manual operation is reduced.

In the present embodiment, the part of the virtual screen V1 to be displayed in the display area R1 is restored on the basis of the marker information, and the lens optical system is controlled. Therefore, if a part of the virtual screen corresponding to a desired state is stored in advance into the memory as marker information, the user can restore the desired state at an optional time point.

In the present embodiment, the state of the lens optical system 30 includes the state of the focus group 31, the zoom group 32, or the diaphragm 33 of the lens optical system. Therefore, the user can easily control the focus position, the zoom magnification, or the diaphragm value of the lens optical system 30.

In the present embodiment, the lens optical system 30 and the touch display 21 are separated. Therefore, vibration caused by an operation input to the touch display 21 by the user is not transmitted to the lens optical system 30. Therefore, shake caused by the user's operation does not occur.

Modification of First Embodiment

In the lens system 100 of the present embodiment, the processor 23 only needs to generate at least one or more virtual screens V1, and may generate a plurality of virtual screens V1, for example.

Figure 12:
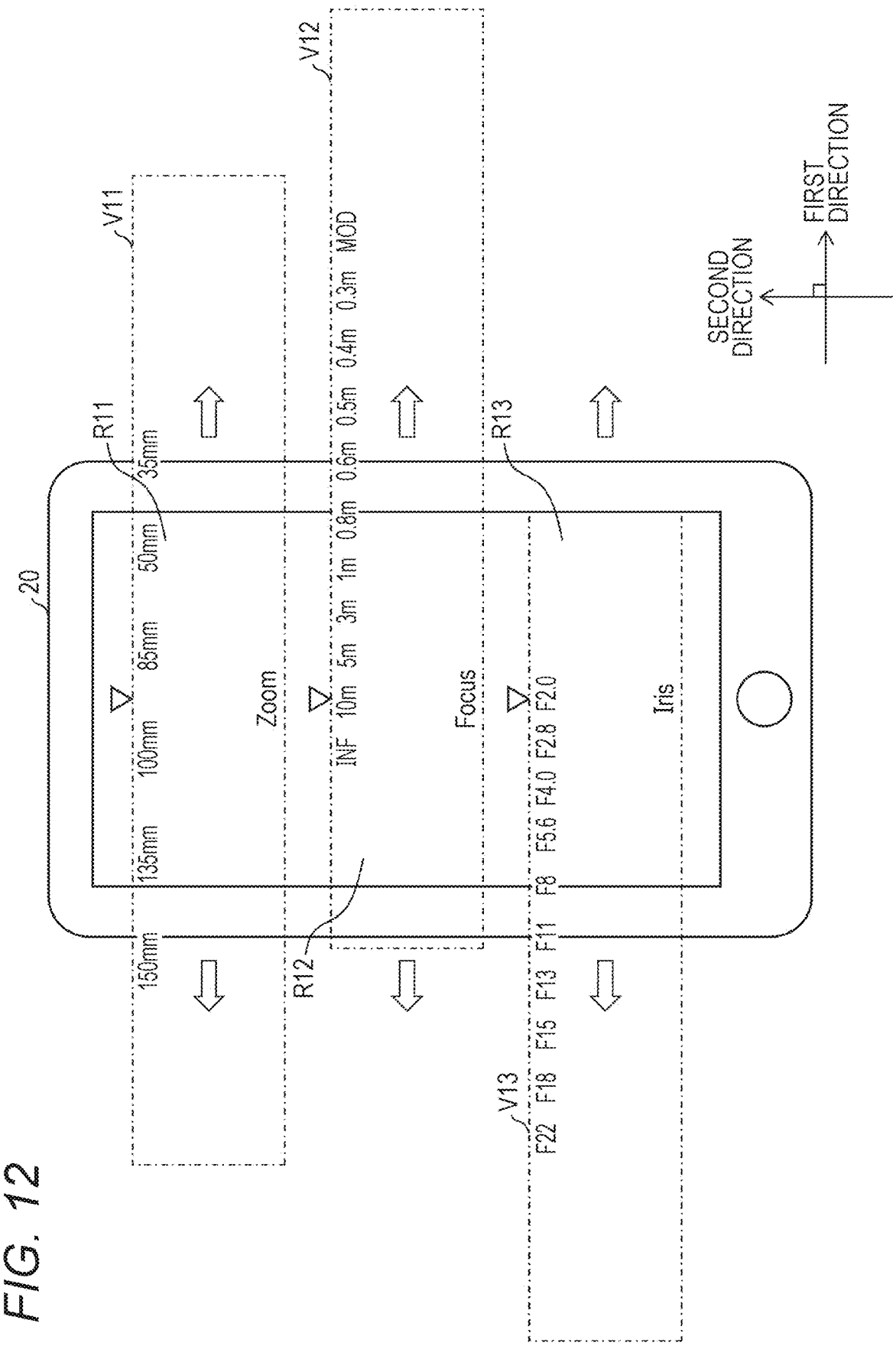
FIG. 12 is a schematic diagram showing a modification of a configuration of the operation terminal and the virtual screen in the lens system shown in FIG. 1.

The configuration in which the processor 23 generates the plurality or virtual screens V1 will be described with reference to FIG. 12. FIG. 12 is a schematic diagram showing a modification of the configurations of the operation terminal 20 and the virtual screen V1 in the lens system 100 shown in FIG. 1. In FIG. 12, a horizontal direction from the left side to the right side is defined as a first direction, and a vertical direction from the lower side to the upper side is defined as a second direction. As shown in FIG. 12, in the present modification, three virtual screens V11, V12, and V13 are generated by the processor 23. The virtual screens V11, V12, and V13 are associated with the zoom (Zoom), the focus (Focus), and the diaphragm (Iris), respectively, by the control processing program P20. The processor 23 selects a control target from the focus, the zoom, and the diaphragm with reference to which of the virtual screens V11, V12, and V13 to include the position (reference position) that the user first touched in the first standby processing S21. Three display areas R11, R12, and R13 are each independently controlled by the processor 23.

Figure 13:
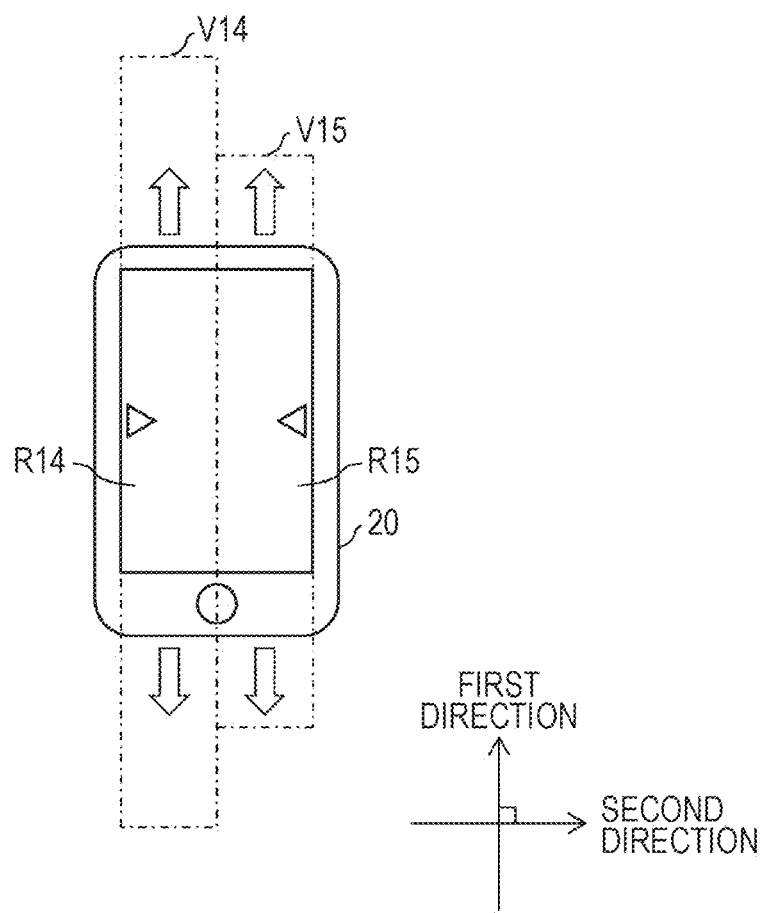
FIG. 13 is a schematic diagram showing a modification of a configuration of the operation terminal and the virtual screen in the lens system shown in FIG. 1.

The configuration in which the processor 23 generates the plurality of virtual screens V1 is not limited to the modification shown in FIG. 12. Another configuration in which the processor 23 generates the plurality of virtual screens V1 will be described with reference to FIG. 13. FIG. 13 is a schematic diagram showing a modification of the configurations of the operation terminal 20 and the virtual screen V1 in the lens system 100 shown in FIG. 1. As shown in FIG. 13, in the present modification, two virtual screens V14 and V15 are generated by the processor 23. Both the virtual screens V14 and V15 are associated with the focus by the control processing program G20, but each has a different length of the first side. Therefore, two types of operation sensitivity are achieved for focus control. The two display areas R14 and R15 are controlled by the processor 23 in conjunction with each other. For example, when the user performs a scroll operation on the display area R14, the processor 23 controls the display area R14 on which the scroll operation has been performed, and controls the display area R15 on which the scroll operation has not been performed so as to work with the display area R14.
(Example of GUI)

Figure 14:
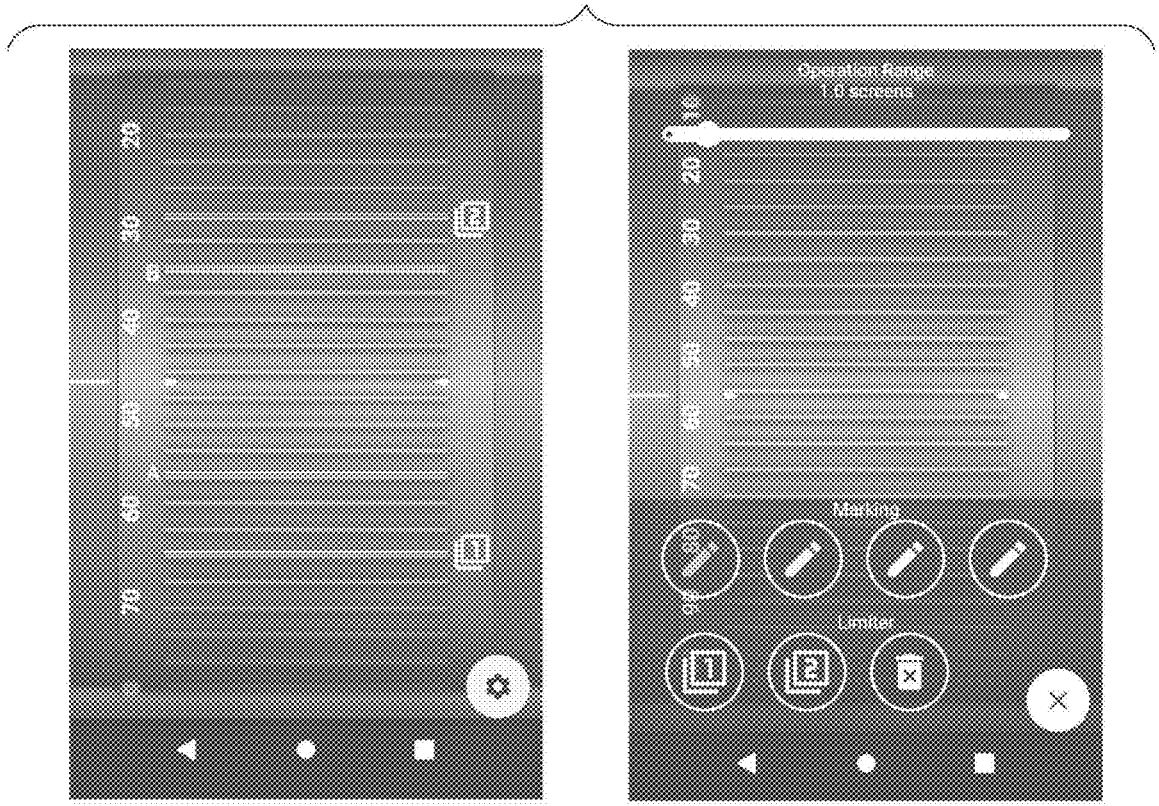
FIG. 14 is a diagram showing one example of a GUI displayed on a touch display of an operation terminal shown in FIG. 1.

One example of a GUI displayed on the touch display 21 in the lens system 100 of the present embodiment will be described with reference to FIG. 14. FIG. 14 is a view showing one example of the GUI displayed on the touch display 21 of the operation terminal 20 shown in FIG. 1.

As shown in the left figure of FIG. 14, in the present embodiment, as a GUI displayed on the touch display 21, a GUI that simulates a focus ring included in the zoom lens is displayed. The menu screen shown in the right figure of FIG. 14 displays GUIs for the user to operate the sensitivity adjustment processing S30 (slider positioned at the upper part), the display restriction processing S40 (numbers "1" and "2" positioned at the lower part), and the marker processing S50 (mark imitating a pen positioned at the center part).

Figure 15:
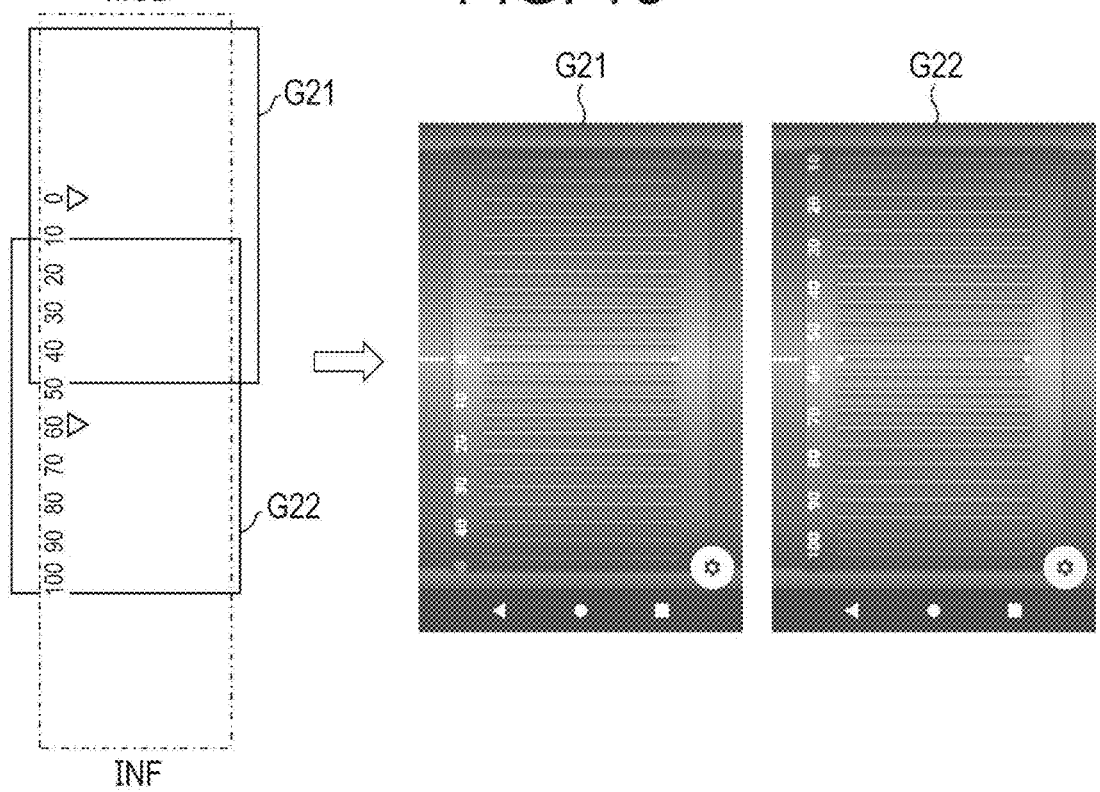
FIG. 15 is a diagram showing a relationship between a configuration (left figure) of the virtual screen in the lens system shown in FIG. 1 and one example (right figure) of the GUI displayed on the touch display of the operation terminal.

Another embodiment of the GUI displayed on the touch display 21 will be described with reference to FIG. 15. FIG. 15 is a view showing a relationship between a configuration (left figure) of the virtual screen V1 in the lens system 100 shown in FIG. 1 and one example (right figure) of the GUI displayed on the touch display 21 of the operation terminal 20. As shown in FIG. 15, when the part of the virtual screen V1 displayed on the touch display 21 changes, the GUI changes in conunction with the change. For example, when the part to be displayed changes (left figure in FIG. 15), the GUI imitating a focus ring changes in a manner imitating the rotation of the focus ring.

Figure 16:
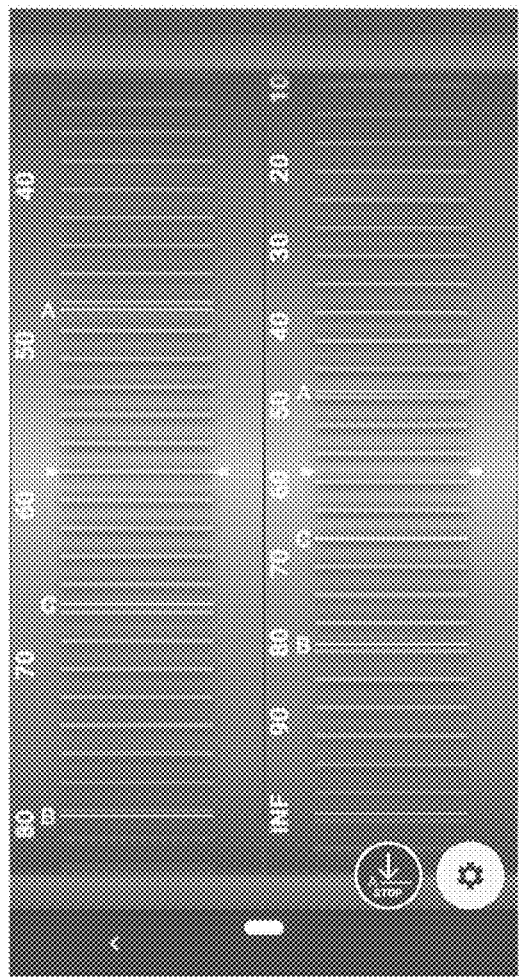
FIG. 16 is a diagram showing one example of a GUI displayed on a touch display of an operation terminal in the modification shown in FIG. 13.

As another example, FIG. 16 is a diagram showing an example of a GUI to be displayed on the touch display 21 of the operation terminal 20 in the modification shown in FIG. 13.

Second Embodiment

Another embodiment of the present invention will be described below. For convenience of explanation, members having the same functions as those described in the above embodiment are denoted by the same reference signs, and description thereof will not be repeated.
(Configuration of Lens System)

Figure 17:
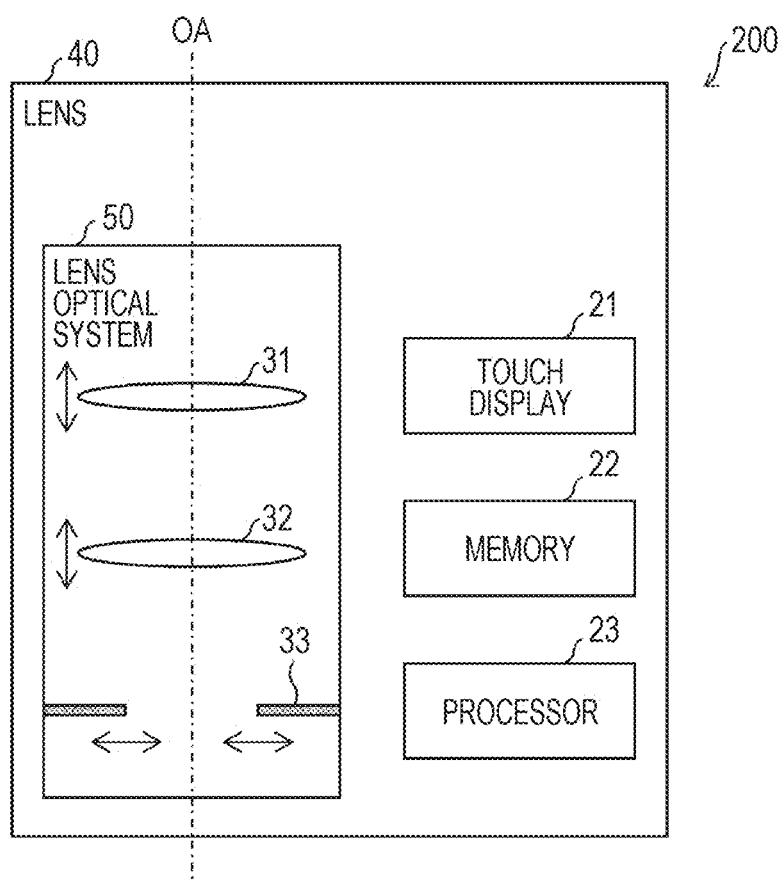
FIG. 17 is a block diagram showing a configuration of a lens system according to a second embodiment or the present invention.

The configuration of a lens system 200 according to the second embodiment of the present invention will be described with reference to FIG. 17. FIG. 17 is a block diagram showing the configuration of the lens system 200 according to the second embodiment of the present invention. As shown in FIG. 17, the lens system 200 includes an operation terminal 40.

The operation terminal 40 includes the touch display 21, the memory 22, the processor 23, and a lens optical system 50. In the present embodiment, a smartphone is used as the operation terminal 40.

In the present embodiment, the operation terminal 40 is not limited to a smartphone, and is only required to be any terminal having the touch display 21 and the lens optical system 50. Examples of the operation terminal 40 other than the smartphone include a camera having a rear touch display, a handy cam, and a smart watch incorporating a camera.

The lens optical system 50 includes the focus group 31, the zoom group 32, and the diaphragm 33. Each of the focus group 31, the zoom group 32, and the diaphragm 33 is controlled similarly to those in the above-described embodiment.

In the present embodiment, the processor 23 can control image processing on an image imaged using the lens optical system 50, or can change the setting of a camera connected to the lens optical system 50. For example in the lens system 200, digital zoom may be performed in addition to or instead of optical zoom by the zoom group 32. For example, in the lens system 200, the ISO sensitivity of the camera included in the smartphone positioned on the optical axis OA of the lens optical system 50 may be changed. In other words, the processor 23 controls the part of the virtual screen V1 to be displayed on the touch display 21 in response to the user's scroll operation on the touch display 21, and controls the setting such that the setting related to imaging using the lens optical system 50 works with the part of the virtual screen V1 to be displayed on the touch display 21. In the present embodiment, examples of the setting regarding imaging include setting regarding image processing for an image imaged using the lens optical system 50 and setting regarding a camera connected to the lens optical system 50.

Setting change of the digital zoom and the ISO sensitivity is performed by the processor 23 developing and executing the control processing program P20 stored in the memory 22.

In the lens system 200, the image processing controlled by the processor 23 is not limited to the digital zoom. Examples of the image processing include digital zoom, exposure correction, and filter processing. Examples of the filter processing include soft focus, noise addition, and blurring processing. In the lens system 200, examples of the setting related to the camera controlled by the processor 23 include ISO sensitivity.

The processor 23 adjusts parameters of image processing. For example, in a case where the image processing is digital zoom, the processor 23 controls the digital zoom such that the enlargement ratio of the digital zoom with respect to the image imaged using the lens optical system 50 works with the part of the virtual screen V1 to be displayed on the touch display 21. For example, in a case where the image processing is exposure correction, the processor 23 controls the exposure correction such that, a stage of the exposure correction of the image imaged using the lens optical system 50 works with a part of the virtual screen V1 to be displayed on the touch display 21. For example, in a case where the image processing is filter processing, the processor 23 controls the filter processing such that the filter strength for the image imaged using the lens optical system 50 works with the part of the virtual screen V1 to be displayed on the touch display 21.

In a case where the setting of the camera to be controlled is the ISO sensitivity, the processor 23 controls the ISO sensitivity such that, for example, the ISO sensitivity of the camera works with the part of the virtual screen V1 to be displayed on the touch display 21.
(Configurations of Operation Terminal and Virtual Screen)

Figure 18:
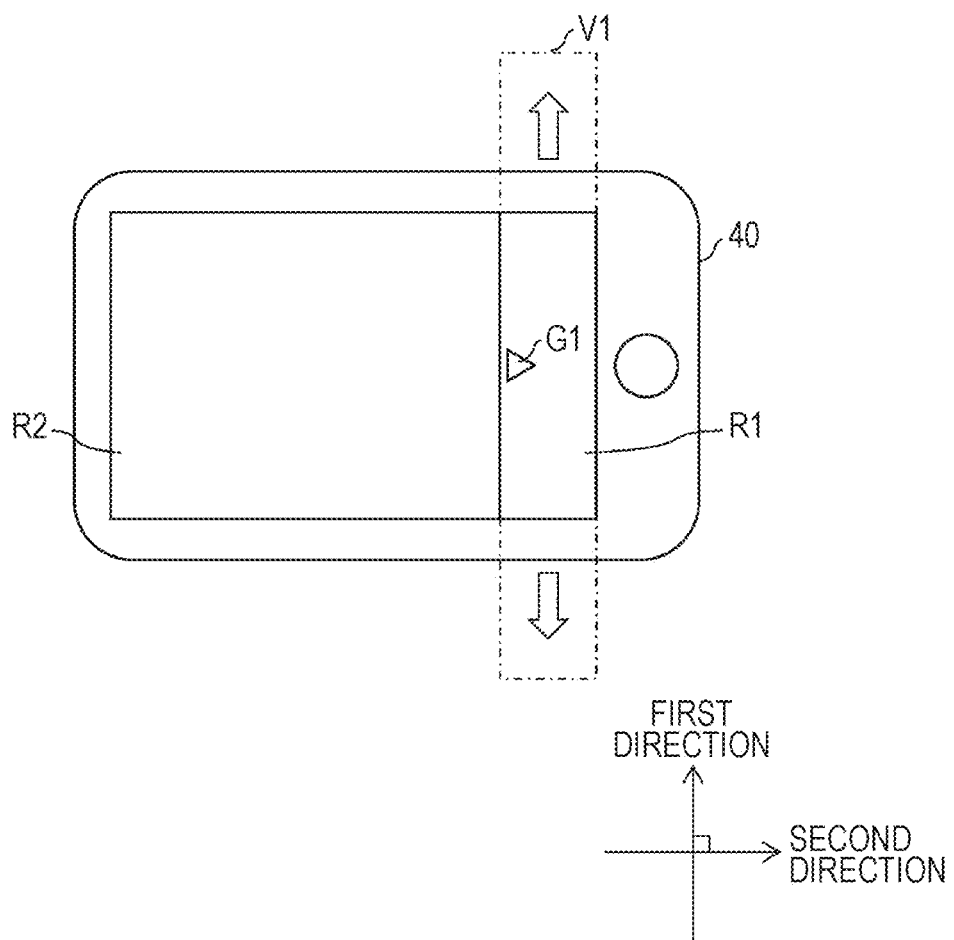
FIG. 18 is a schematic diagram showing a configuration of an operation terminal and a virtual screen in the lens system shown in FIG. 17.

The virtual screen in the lens system 200 will be described with reference to FIG. 18. FIG. 18 is a schematic diagram showing the configurations of the operation terminal 40 and the virtual screen V1 in the lens system 200 shown in FIG. 17.

As shown in FIG. 18, the touch display 21 of the operation terminal 40 includes the display area R1 and a display area R2. In the present embodiment, the display area R1 spreads over a part of the display of the touch display 21. The display area R2 functions as a live view monitor that displays, to the user, an image of the subject obtained by the image sensor of the operation terminal 40.
(Control Processing of Lens System)

Figure 19:
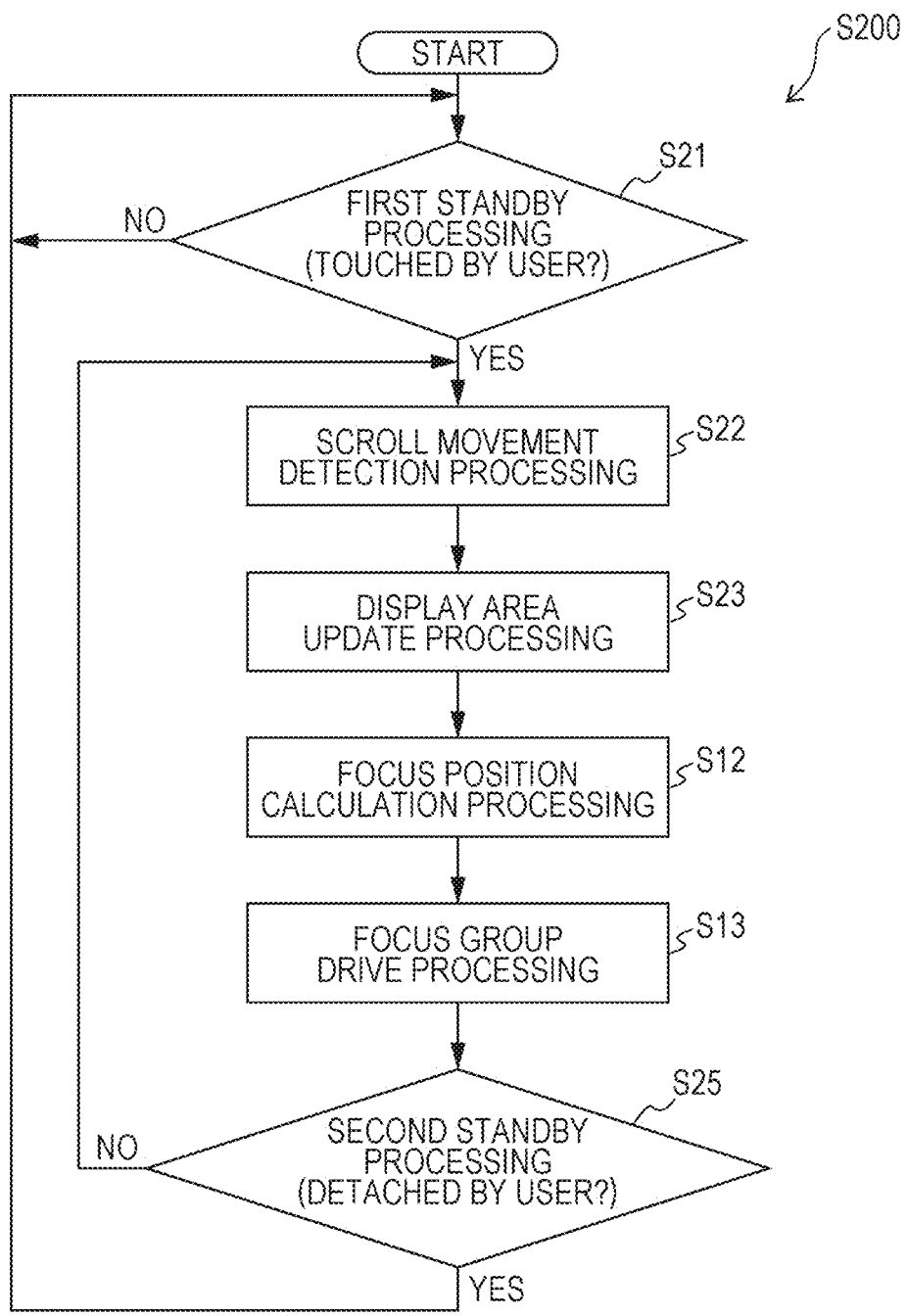
FIG. 19 is a flowchart showing a flow of control processing executed by a processor of an operation terminal shown in FIG. 17.

Control processing S200 of the lens system 200 will be described with reference to FIG. 19. FIG. 19 is a flowchart showing a flow of the control processing S200 executed by the processor 23 of the operation terminal 40 shown in FIG. 17.

As shown in FIG. 19, the control processing S200 includes the first standby processing S21, the scroll movement detection processing S22, the display area update processing S23, the focus position calculation processing 812, the focus group drive processing 813, and the second standby processing 825. In the control processing S200, the focus position calculation processing S12 and the focus group drive processing 813 are executed by the processor 23 of the operation terminal 40.

(Implementation Example by Software)

Functions of the lens systems 100 and 200 (hereinafter, referred to as "system") can be implemented by the control processing programs P10 and P20 for causing the lens optical system 30 or 50 and the touch display 21 to function as the system, particularly the control processing program 20.

The control processing programs P10 and P20 may be recorded in one or a plurality of non-transitory, computer-readable recording media. The recording media may or need not be included in the system. In the latter case, the control processing programs P10 and P20 may be supplied to the system via any wired or wireless transmission medium.

Summary

The lens system (100 or 200) in a first aspect of the present invention includes the lens optical system (30 or 50), the touch display (21), and at least one processor (11 or 23) configured to control a part of the virtual screen (V1) to be displayed on the touch display in accordance with a scroll operation of a user on the touch display, and control the lens optical system in such a manner that a state of the lens optical system works with the part of the virtual screen to be displayed on the touch display. According to the first aspect, it is possible to achieve a lens system that is simple in operation, has a low delay, and can accurately control a lens optical system.

In the lens system (100 or 200) in a second aspect of the present invention, in the first aspect, the touch display has a rectangular display area (R1) including a first side (ER1) and a second side (ER2) orthogonal to the first side, the virtual screen is a rectangle including a first side (EV1) that is parallel to the first side of the display area and is longer than the first side of the display area, and a second side (EV2) that is parallel to the second side of the display area, and the scroll operation is an operation for moving the virtual screen in a direction parallel to the first side of the virtual screen. This configuration is more effective for achieving a lens system that is simple in operation, has a low delay, and can accurately control a lens optical system.

In the lens system (100 or 200) in a third aspect of the present invention, in the second aspect, the at least one processor sets a length of the first side of the virtual screen in response to a user's operation. This configuration is more effective for achieving a lens system that is simple in operation, has a low delay, and can accurately control a lens optical system.

In the lens system (100 or 200) in a fourth aspect of the present invention, in any one of the first to third aspects, the at least one processor restricts a part of the virtual screen that can be displayed on the touch display to a part of the virtual screen based on information (limit information) indicating a position of a restriction end (L1 or L2) set by a user. This configuration is more effective for achieving a lens system that is simple in operation, has a low delay, and can accurately control a lens optical system.

In the lens system (100 or 200) in a fifth aspect of the present invention, in any one of the first to fourth aspects, the at least one processor writes information indicating a part of the virtual screen that is currently displayed on the touch display into a memory (22) as marker information (IMA, IMB, or IMC) in response to a user's operation, and the at least one processor generates a marker (GMA, GMB, or GM) in the virtual screen based on the marker information. This configuration is more effective for achieving a lens system that is simple in operation, has a low delay, and can accurately control a lens optical system.

In the lens system (100 or 200) in a sixth aspect of the present invention, in the fifth aspect, the at least one processor restricts a part of the virtual screen that can be displayed on the touch display to a part of the virtual screen based on the marker information and information indicating a position (reference position) at which a user touches the touch display in the scroll operation or information indicating a part (scroll position) displayed on the touch display at a time point when the user touches the touch display. This configuration is more effective for achieving a lens system that is simple in operation, has a low delay, and can accurately control a lens optical system.

In the lens system (100 or 200) in a seventh aspect of the present invention, in the fifth or sixth aspect, the at least one processor restores, based on the marker information, a part of the virtual screen to be displayed on the touch display. This configuration is more effective for achieving a lens system that is simple in operation, has a low delay, and can accurately control a lens optical system.

In the lens system (100 or 200) in an eighth aspect of the present invention, in the first to seventh aspects, the state of the lens optical system includes a state of focus (focus group 31), zoom (zoom group 32 or 32A), diaphragm (diaphragm 33), or a variable ND filter of the lens optical system. This configuration is more effective for achieving a lens system that is simple in operation, has a low delay, and can accurately control a lens optical system.

The conventional technique has disadvantages in operability, delay, and accuracy for controlling setting such as image processing setting or camera setting regarding imaging using the lens optical system (30 or 50) Therefore, it is required to achieve a lens system that is simple in operation, has a low delay, and can accurately control settings related to imaging using a lens optical system.

The lens system (200) in a ninth aspect of the present invention includes: the lens optical system (50); the touch display (21); and at least one processor (23) configured to control a part of the virtual screen (V1) to be displayed on the touch display in response to a user's scroll operation on the touch display, in which the at least one processor controls setting in such a manner that the setting related to imaging using the lens optical system works with the part of the virtual screen to be displayed on the touch display. According to the ninth aspect, it is possible to achieve a lens system that is simple in operation, has a low delay, and can accurately control a lens optical system. According to the ninth aspect, it is possible to achieve a lens system that is simple in operation, has a low delay, and can accurately control settings related to imaging using a lens optical system.

In the lens system (200) in a tenth aspect of the present invention, in the ninth aspect, the setting related to imaging is setting related to image processing on an image imaged using the lens optical system or setting related to a camera connected to the lens optical system. This configuration is more effective for achieving a lens system that is simple in operation, has a low delay, and can accurately control a lens optical system. According to this configuration, it is possible to achieve a lens system that is simple in operation, has a low delay, and can accurately control settings related to imaging using a lens optical system.

The program (control processing program P10 or P20) according to an eleventh aspect of the present invention is a program for controlling a lens system including a lens optical system and a touch display, the program causing at least one processor to execute processing of controlling a part of a virtual screen to be displayed on the touch display in accordance with a scroll operation of a user on the touch display, and controlling the lens optical system in such a manner that a state of the lens optical system works with the part of the virtual screen to be displayed on the touch display. This configuration is more effective for achieving a lens system that is simple in operation, has a low delay, and can accurately control a lens optical system.

The program (control processing program P20) according to a twelfth aspect of the present invention is a program for controlling a lens system including a lens optical system and a touch display, the program causing at least one processor to execute processing of controlling a part of a virtual screen to be displayed on the touch display in accordance with a scroll operation of a user on the touch display, and controlling setting in such a manner that the setting related to imaging using the lens optical system works with the part of the virtual screen to be displayed on the touch display. This configuration is more effective for achieving a lens system that is simple in operation, has a low delay, and can accurately control a lens optical system. This configuration is more effective for achieving a lens system that is simple in operation, has a low delay, and can accurately control settings related to imaging using a lens optical system.

In the lens system (100) in a thirteenth aspect of the present invention, in any one of the first to tenth aspects, the lens optical system (30) and the touch display (21) are separated. This configuration is more effective for achieving a lens system that is simple in operation, has a low delay, and can accurately control a lens optical system.

SUPPLEMENTARY INFORMATION

The present invention is not limited to the embodiments described above, and various changes are possible within the scope of the claims, and embodiments obtained by appropriately combining technical means disclosed in different embodiments are also included in the technical scope of the present invention.

What is claimed is:

1. A lens system comprising:
a lens optical system;
a touch display; and
at least one processor configured to
control a part of a virtual screen to be displayed on the touch display in accordance with a scroll operation of a user on the touch display, and control the lens optical system in such a manner that a state of the lens optical system works with the part of the virtual screen to be displayed on the touch display,
write information indicating a part of the virtual screen that is currently displayed on the touch display into a memory as marker information in response to a user's operation, and
generate a marker in the virtual screen based on the marker information.

2. The lens system according to claim 1, wherein
the touch display has a rectangular display area including a first side and a second side orthogonal to the first side,
the virtual screen is a rectangle including a first side that is parallel to the first side of the display area and is longer than the first side of the display area, and a second side that is parallel to the second side of the display area, and
the scroll operation is an operation for moving the virtual screen in a direction parallel to the first side of the virtual screen.

3. The lens system according to claim 2, wherein
the at least one processor is further configured to set a length of the first side of the virtual screen in response to a user's operation.

4. The lens system according to claim 1, wherein
the at least one processor is further configured to restrict a part of the virtual screen that can be displayed on the touch display to a part of the virtual screen based on information indicating a position of a restriction end set by a user.

5. The lens system according to claim 1, wherein
the at least one processor is further configured to restore, based on the marker information, the part of the virtual screen to be displayed on the touch display.

6. The lens system according to claim 1, wherein
the state of the lens optical system includes a state of focus, zoom, a diaphragm, or a variable ND filter of the lens optical system.

7. A lens system comprising:
a lens optical system;
a touch display; and
at least one processor configured to
control a part of a virtual screen to be displayed on the touch display in accordance with a scroll operation of a user on the touch display, and control the lens optical system in such a manner that a state of the lens optical system works with the part of the virtual screen to be displayed on the touch display, and
restrict a part of the virtual screen that can be displayed on the touch display to a part of the virtual screen based on information indicating a position at which a user touches the touch display in the scroll operation or information indicating a part displayed on the touch display at a time point when the user touches the touch display.

8. A lens system comprising:
a lens optical system;
a touch display; and
at least one processor configured to
control a part of a virtual screen to be displayed on the touch display in response to a user's scroll operation on the touch display,
control setting related to imaging using the lens optical system in such a manner that the setting works with the part of the virtual screen to be displayed on the touch display,
write information indicating a part of the virtual screen that is currently displayed on the touch display into a memory as marker information in response to a user's operation, and
generate a marker in the virtual screen based on the marker information.

9. The lens system according to claim 8, wherein
the setting related to imaging is setting related to image processing on an image imaged using the lens optical system or setting related to a camera connected to the lens optical system.

10. A non-transitory computer-readable medium having embodied thereon a program, which when executed by a computer causes the computer to execute a method for controlling a lens system including a lens optical system and a touch display, the the method comprising:
controlling a part of a virtual screen to be displayed on the touch display in accordance with a scroll operation of a user on the touch display, and controlling the lens optical system in such a manner that a state of the lens optical system works with the part of the virtual screen to be displayed on the touch display;
writing information indicating a part of the virtual screen that is currently displayed on the touch display into a memory as marker information in response to a user's operation; and
generating a marker in the virtual screen based on the marker information.

11. A non-transitory computer-readable medium having embodied thereon a program, which when executed by a computer causes the computer to execute a method for controlling a lens system including a lens optical system and a touch display, the the method comprising:
controlling a part of a virtual screen to be displayed on the touch display in accordance with a scroll operation of a user on the touch display, and controlling setting related to imaging using the lens optical system in such a manner that the setting works with the part of the virtual screen to be displayed on the touch display;
writing information indicating a part of the virtual screen that is currently displayed on the touch display into a memory as marker information in response to a user's operation; and
generating a marker in the virtual screen based on the marker information.

\* \* \* \* \*